US012634881B2

(12) United States Patent
Yang et al.

(10) Patent No.: US 12,634,881 B2
(45) Date of Patent: May 19, 2026

(54) PAGING TRANSMISSION METHOD AND DEVICE

(71) Applicant: VIVO MOBILE COMMUNICATION CO., LTD., Dongguan (CN)

(72) Inventors: Xiaodong Yang, Dongguan (CN); Fei Yang, Dongguan (CN); Feng Zhu, Dongguan (CN); Wei Bao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 497 days.

(21) Appl. No.: 17/378,623

(22) Filed: Jul. 16, 2021

(65) Prior Publication Data

US 2021/0352618 A1    Nov. 11, 2021

Related U.S. Application Data

(63) Continuation of application No. PCT/CN2020/072688, filed on Jan. 17, 2020.

(30) Foreign Application Priority Data

Jan. 18, 2019    (CN) ......................... 201910056701.X
Jan. 18, 2019    (CN) ......................... 201910057158.5

(51) Int. Cl.
*H04W 68/00*        (2009.01)
*H04W 8/18*         (2009.01)
*H04W 8/20*         (2009.01)

(52) U.S. Cl.
CPC ......... *H04W 68/005* (2013.01); *H04W 8/183* (2013.01); *H04W 8/20* (2013.01)

(58) Field of Classification Search
CPC ..... H04W 68/005; H04W 8/183; H04W 8/20; H04W 88/06
See application file for complete search history.

(56) References Cited

U.S. PATENT DOCUMENTS 9,872,239 B2    1/2018  Lee
10,588,111 B2    3/2020  Fujishiro et al.
(Continued)

FOREIGN PATENT DOCUMENTS

CA        3067468 A1 * 12/2018  ............ H04W 68/02
CN    101951287 A        1/2011
(Continued)

OTHER PUBLICATIONS

First Office Action regarding Japanese Patent Application No. 2021-541673, dated Jul. 13, 2022. Translation provided by Bohui Intellectual Property.
(Continued)

*Primary Examiner* — Derrick W Ferris
*Assistant Examiner* — Jesse P. Samluk
(74) *Attorney, Agent, or Firm* — Harness, Dickey & Pierce, P.L.C.

(57)        ABSTRACT

A paging message transmission method includes: receiving indication information from a core network device, the indication information is used to indicate a target transmission manner; and sending a first paging message to UE in the target transmission manner. The target transmission manner includes at least one of: for a second paging message of one SIM card, retransmitting the second paging message at X first transmission locations, transmitting the second paging message in an offset manner based on a predetermined offset and/or in a predetermined offset direction, or transmitting the second paging message at a second transmission location. The second transmission location is different from an original transmission location that is used to transmit the second paging message, M and X are integers greater than 1, N is a positive integer, and N is less than or equal to M.

11 Claims, 6 Drawing Sheets

(56)

References Cited

U.S. PATENT DOCUMENTS

| | | | | |
|---|---|---|---|---|
| 10,798,679 | B2 | 10/2020 | Liu et al. | |
| 2012/0057525 | A1 | 3/2012 | Hou | |
| 2012/0113846 | A1 | 5/2012 | Narasimha et al. | |
| 2012/0264449 | A1* | 10/2012 | Kazmi | G01S 5/011 455/456.1 |
| 2014/0073312 | A1 | 3/2014 | Su et al. | |
| 2017/0196042 | A1 | 7/2017 | Shah et al. | |
| 2018/0084524 | A1 | 3/2018 | Pradas et al. | |
| 2018/0176847 | A1* | 6/2018 | Fasil Abdul | H04L 1/1896 |
| 2018/0368099 | A1* | 12/2018 | Chen | H04W 48/18 |
| 2019/0239192 | A1* | 8/2019 | Tang | H04B 7/0695 |
| 2020/0037380 | A1* | 1/2020 | Qiu | H04W 68/12 |
| 2020/0296687 | A1* | 9/2020 | Zhu | H04W 68/005 |
| 2020/0305120 | A1* | 9/2020 | Tang | H04W 68/00 |
| 2021/0266840 | A1* | 8/2021 | Xu | H04W 68/00 |

FOREIGN PATENT DOCUMENTS

| | | | |
|---|---|---|---|
| CN | 103380648 | A | 10/2013 |
| CN | 103906276 | A | 7/2014 |
| CN | 106162569 | A | 11/2016 |
| CN | 106465329 | A | 2/2017 |
| CN | 106714305 | A | 5/2017 |
| CN | 107509201 | A | 12/2017 |
| CN | 107623900 | A | 1/2018 |
| CN | 107770863 | A | 3/2018 |
| CN | 107820235 | A | 3/2018 |
| CN | 108012312 | A | 5/2018 |
| CN | 108668359 | A | 10/2018 |
| CN | 108811084 | A | 11/2018 |
| EP | 2509387 | A1 | 10/2012 |
| EP | 3258717 | A1 | 12/2017 |
| EP | 3301484 | A1 | 4/2018 |
| JP | 2000333238 | A | 11/2000 |
| WO | WO-2015070414 | A1 * | 5/2015 ............ H04W 48/06 |
| WO | WO-2017026188 | A1 | 2/2017 |
| WO | WO-2017184048 | A1 | 10/2017 |
| WO | WO-2018161244 | A1 | 9/2018 |

OTHER PUBLICATIONS

"Avoidance of paging collisions to minimize outage of services," Qualcomm Incorporated et al., SA WG2 Meeting #122, S2-174243, dated Jun. 30, 2017.

International Search Report and Written Opinion of the International Searching Authority regarding International Patent Application No. PCT/CN2020/072688, dated Apr. 8, 2020. Translation provided by Bohui Intellectual Property.

First Office Action regarding Chinese Patent Application No. 201910057158.5 dated Dec. 10, 2020. Translation provided by Bohui Intellectual Property.

First Office Action regarding Chinese Patent Application No. 201910056701.X, dated Dec. 7, 2020. Translation provided by Bohui Intellectual Property.

Second Office Action regarding Chinese Patent Application No. 201910056701.X, dated Jun. 25, 2021. Translation provided by Bohui Intellectual Property.

Supplementary European Search Report regarding Patent Application No. 20741096.0-1212/3913999; PCT/CN2020/072688, dated Feb. 21, 2022.

* cited by examiner

800

UE

Obtaining module — 801

Receiving module — 802

900

Network module

Sending module — 901

PAGING TRANSMISSION METHOD AND DEVICE

CROSS-REFERENCE TO RELATED APPLICATIONS

This application is a Bypass Continuation Application of PCT/CN2020/072688 filed on Jan. 17, 2020, which claims priority to Chinese Patent Application No. 201910057158.5 and No. 201910056701.X, filed on Jan. 18, 2019, which are incorporated herein by reference in their entireties.

TECHNICAL FIELD

Embodiments of this application relate to the field of communications technologies, and in particular, to a paging message transmission method and a device.

BACKGROUND

With the development of communications technologies, there are more and more pieces of user equipment (UE) with multiple subscriber identity module (SIM) cards (multi-card UE for short).

SUMMARY

According to a first aspect, an embodiment of this application provides a paging message transmission method, applied to a radio access network (RAN) device, where the method includes:

receiving indication information from a core network device, where the indication information is used to indicate a target transmission manner; and sending a first paging message to UE in the target transmission manner, where the UE includes M SIM cards, the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, M and X are integers greater than 1, N is a positive integer, and N is less than or equal to M.

According to a second aspect, an embodiment of this application provides a paging message transmission method, applied to a core network device, where the method includes:

sending indication information to a RAN device, where the indication information is used to indicate a target transmission manner and is further used to instruct the RAN device to send a first paging message to UE in the target transmission manner, the UE includes M SIM cards, the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, M and X are integers greater than 1. N is a positive integer, and N is less than or equal to M.

According to a third aspect, an embodiment of this application provides a paging message transmission method, applied to UE, where the UE includes M SIM cards, M is an integer greater than 1, and the method includes:

receiving a first paging message from a RAN device in a target transmission manner, where the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, N is a positive integer. X is an integer greater than 1, and N is less than or equal to M.

According to a fourth aspect, an embodiment of this application provides a RAN device, where the RAN device includes a receiving module and a sending module;

the receiving module is configured to receive indication information from a core network device, where the indication information is used to indicate a target transmission manner; and the sending module is configured to send a first paging message to UE in the target transmission manner, where the UE includes M SIM cards, the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, M and X are integers greater than 1, N is a positive integer, and N is less than or equal to M.

According to a fifth aspect, an embodiment of this application provides a core network device, where the core network device includes a sending module; and the sending module is configured to send indication information to a RAN device, where the indication information is used to indicate a target transmission manner and is further used to instruct the RAN device to send a first paging message to UE in the target transmission manner, the UE includes M SIM cards, the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message. M and X are integers greater than 1, N is a positive integer, and N is less than or equal to M.

According to a sixth aspect, an embodiment of this application provides UE, where the UE includes M SIM cards, M is an integer greater than 1, and the UE includes a receiving module;

the receiving module is configured to receive a first paging message from a RAN device in a target transmission manner, where the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, N is a positive integer, X is an integer greater than 1, and N is less than or equal to M.

According to a seventh aspect, an embodiment of this application provides a paging message transmission method, applied to UE, where the UE includes M SIM cards, M is a positive integer greater than 1, and the method includes:

obtaining target information in a case where the UE camps in a first cell, where the target information is used to indicate whether the first cell supports and/or uses a first transmission manner for transmitting paging messages; and receiving a first paging message from a network device in a second transmission manner based on the target information, where the first paging message includes paging messages corresponding to N SIM cards; and the first transmission manner includes at least one of the following: for a second paging message of one SIM card, retransmitting the second paging message at X first transmission locations;

transmitting the second paging message in an offset manner based on a predetermined offset and/or in a predetermined offset direction, or transmitting the second paging message at a second transmission location, where the second transmission location is different from an original transmission location that is used to transmit the second paging message, N is a positive integer and is less than or equal to M, and X is an integer greater than 1.

According to an eighth aspect, an embodiment of this application provides a paging message transmission method, applied to a network device, where the method includes:

sending a first paging message to UE in a second transmission manner in a case where the UE camps in a first cell, where the second transmission manner includes a first transmission manner or is a non-first transmission manner, the UE includes M SIM cards, and the first paging message includes paging messages corresponding to N SIM cards; and the first transmission manner includes at least one of the following: for a second paging message of one SIM card, retransmitting the second paging message at X first transmission locations;

transmitting the second paging message in an offset manner based on a predetermined offset and/or in a predetermined offset direction; or transmitting the second paging message at a second transmission location, where the second transmission location is different from an original transmission location that is used to transmit the second paging message, M and X are integers greater than 1, N is a positive integer, and N is less than or equal to M.

According to a ninth aspect, an embodiment of this application provides UE, where the UE includes M SIM cards, M is a positive integer greater than 1, and the UE includes:

an obtaining module, configured to obtain target information in a case where the UE camps in a first cell, where the target information is used to indicate whether the first cell supports and/or uses a first transmission manner for transmitting paging messages; and a receiving module, configured to receive a first paging message from a network device in a second transmission manner based on the target information obtained by the obtaining module, where the first paging message includes paging messages corresponding to N SIM cards; and the first transmission manner includes at least one of the following: for a second paging message of one SIM card, retransmitting the second paging message at X first transmission locations;

transmitting the second paging message in an offset manner based on a predetermined offset and/or in a predetermined offset direction; or transmitting the second paging message at a second transmission location, where the second transmission location is different from an original transmission location that is used to transmit the second paging message, N is a positive integer and is less than or equal to M, and X is an integer greater than 1.

According to a tenth aspect, an embodiment of this application provides a network device, where the network device includes:

a sending module, configured to send a first paging message to UE in a second transmission manner in a case where the UE camps in a first cell, where the second transmission manner includes a first transmission manner or is not a first transmission manner, the UE includes M SIM cards, and the first paging message includes paging messages corresponding to N SIM cards; and the first transmission manner includes at least one of the following: for a second paging message of one SIM card, retransmitting the second paging message at X first transmission locations;

transmitting the second paging message in an offset manner based on a predetermined offset and/or in a predetermined offset direction, or transmitting the second paging message at a second transmission location, where the second transmission location is different from an original transmission location that is used to transmit the second paging message, M and X are integers greater than 1, N is a positive integer, and N is less than or equal to M.

According to an eleventh aspect, an embodiment of this application provides a RAN device, including: a processor, a memory, and a computer program stored in the memory and executable on the processor, where when the computer program is executed by the processor, the steps of the paging message transmission method provided in the first aspect are implemented.

According to a twelfth aspect, an embodiment of this application provides a core network device, including: a processor, a memory, and a computer program stored in the memory and executable on the processor, where when the computer program is executed by the processor, the steps of the paging message transmission method provided in the second aspect are implemented.

According to a thirteenth aspect, an embodiment of this application provides UE, including: a processor, a memory, and a computer program stored in the memory and executable on the processor, where when the computer program is executed by the processor, the steps of the paging message transmission method provided in the third or seventh aspect are implemented.

According to a fourteenth aspect, an embodiment of this application provides a network device, including: a processor, a memory, and a computer program stored in the memory and executable on the processor, where when the computer program is executed by the processor, the steps of the paging message transmission method provided in the eighth aspect are implemented.

According to a fifteenth aspect, an embodiment of this application provides a non-transitory computer-readable storage medium, where a computer program is stored in the non-transitory computer-readable storage medium, and when the computer program is executed by a processor, the steps of the paging message transmission method provided in the first, second, third, seventh, or eighth aspect are implemented.

DETAILED DESCRIPTION OF EMBODIMENTS

Figures 1, 2:
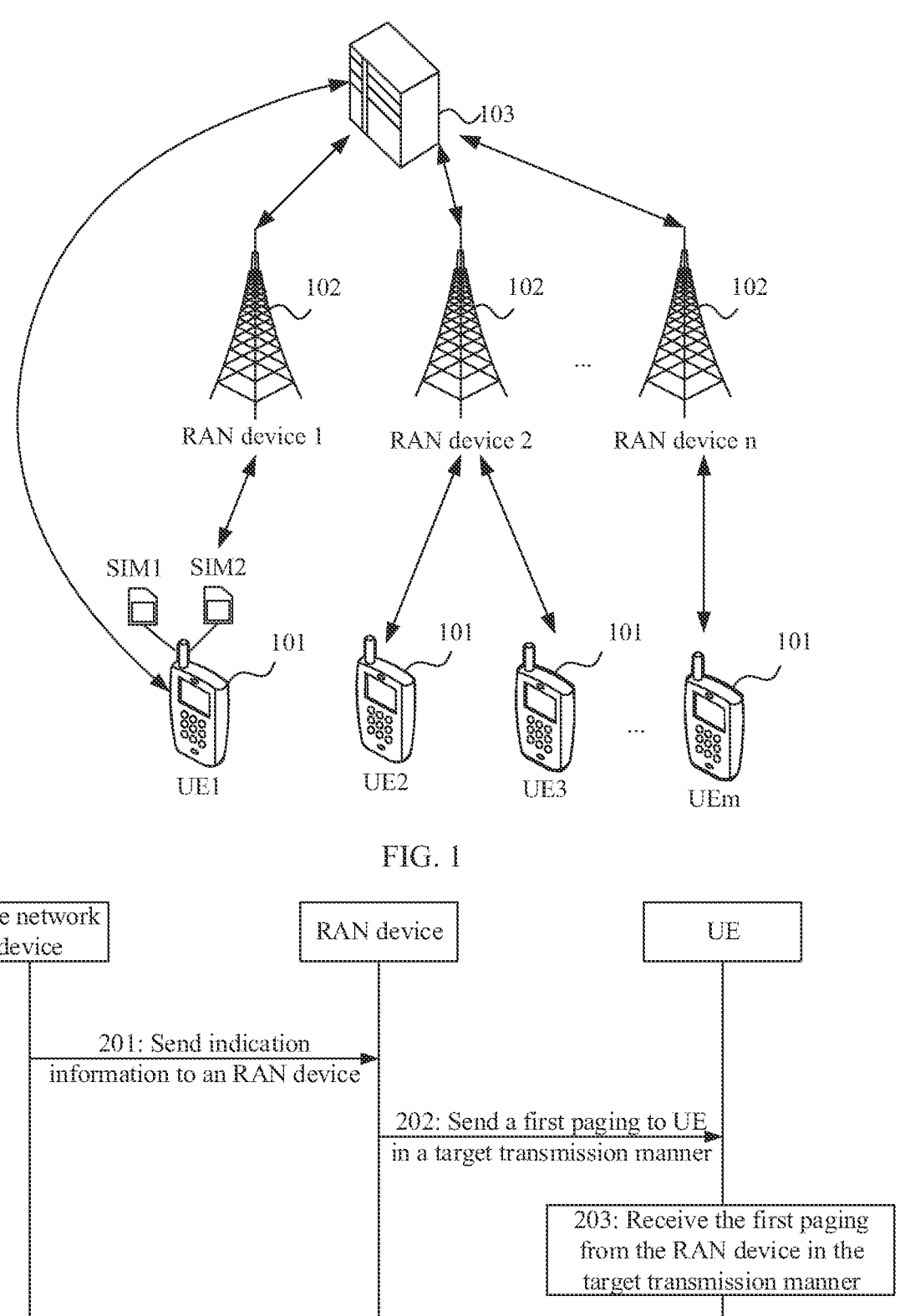
FIG. 1 is a possible schematic structural diagram of a communications system according to an embodiment of this application.
FIG. 2 is a schematic flowchart of interaction of a paging message transmission method according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

It should be noted that "A and/or B" includes the following three combinations: only A, only B. and a combination of A and B.

For ease of understanding, the following describes some terms used in the embodiments of this application.

1. Paging Message

In the related art, when a communications system needs to transmit data to UE, it may send a paging message to the UE through an air interface. The paging message may be used to: send a call request to the UE that is in an idle state, notify the UE that system information changes, instruct the UE to start receiving information from an earthquake and tsunami warning system (ETWS), and instruct the UE to start receiving a commercial mobile alert service (CMAS) notification.

For example, the paging message supports discontinuous reception (DRX). If a DRX function of the UE is enabled, paging messages of the UE are monitored only at a transmission location corresponding to the UE when the UE is in an idle state.

Generally, a radio frame used to transmit paging messages is called paging message frame (PF), and a subframe that is of a paging message frame and that is used to transmit paging messages is called paging occasion (PO). One PF may include at least one PO. A transmission location corresponding to the UE may be one PO in one PF.

2. Ns (Paging Message Density)

Generally, one system corresponds to one Ns, that is, all UE under one communications system corresponds to a same Ns. Ns corresponding to one piece of UE is used to represent a quantity of transmission locations used to transmit paging messages in a radio frame in a corresponding communications system.

(1): For a long term evolution (LTE) system, a PF in which a paging message corresponding to any UE is located can be calculated according to the following formula (1), that is, a system frame number (SFN) of the PF is calculated according to formula (1). Generally, a bit length of an SFN is 10 bits and a value of the bit length is 0 to 1023. A PO that is used to transmit the paging message corresponding to the UE and that is in the PF can be calculated according to the following formula (2), that is, an index number i_s of the PO can be calculated according to formula (2).

$$\text{SFN mod } T = (T \text{ div } N) \times (\text{UE\_ID}/N) \qquad \text{Formula (1)}$$

$$i\_s = \text{floor}(\text{UE\_ID}/N) \bmod Ns \qquad \text{Formula (2)}$$

T is used to represent a DRX period and is configured by a radio resource control (RRC) layer device. The value of T may be: rf32, rf64, rf128, and rf256. The value of N may be: min(T, nB). The value of nB may be: 4T, 2T, T, T/2, T/4, T/8, T/16, T/32.

For example, when a value of nB is greater than or equal to 1, nB may be used to indicate paging message density. The greater the value of nB, the higher the paging message density. For example, when nB=4, one PF includes four POs; when nB=2, one PF includes two POs; and when the value of nB is less than 1, Ns indicates paging message density meeting the formula: Ns=max (1, nB/T). Generally, Ns may be: 1, 2 or 4. When Ns=1, one PF includes one PO; when Ns=2, one PF includes two POs; and when Ns=4, one PF includes four POs.

UE_ID is an identifier of a SIM card of the UE, that is, a PF corresponding to a SIM card can be calculated according to formula (1), and a PO in a PF corresponding to a SIM card can be calculated according to formula (2). For example, the identifier of the SIM card includes any one of the following: an international mobile subscriber identification number (IMSI) and a 5G S-temporary mobile subscription identifier (5G-S-IMSI).

For example, i_s represents an index of a subframe mode, which can be used to query a location of a PO in a PF according to Table 1 or Table 2 below. The following two examples are used to illustrate relationships between i_s and PO and between i_s and Ns.

Example 1: A frequency division duplexing (FDD) system in an LTE system is used as an example. Relationships between i_s and PO and between i_s and Ns are shown in Table 1 below.

TABLE 1

| Ns | PO when i_s = 0 | PO when i_s = 1 | PO when i_s = 2 | PO when i_s = 3 |
|----|-----------------|-----------------|-----------------|-----------------|
| 1 | 9 | N/A | N/A | N/A |
| 2 | 4 | 9 | N/A | N/A |
| 4 | 0 | 4 | 5 | 9 |

Example 2: A time division duplexing (TDD) system in an LTE system is used as an example. Relationships between i_s and PO and between i_s and Ns are shown in Table 2 below. It should be noted that Table 2 applies to all uplink/downlink configurations of the TDD system.

TABLE 2

| Ns | PO when i_s = 0 | PO when i_s = 1 | PO when i_s = 2 | PO when i_s = 3 |
|----|-----------------|-----------------|-----------------|-----------------|
| 1 | 0 | N/A | N/A | N/A |
| 2 | 0 | 5 | N/A | N/A |
| 4 | 0 | 1 | 5 | 6 |

As shown in Table 1 and Table 2, when Ns equals to 1, only one transmission location in a radio frame is used to transmit paging messages; when Ns equals to 2, two transmission locations in a radio frame are used to transmit paging messages; and when Ns equals to 4, four transmission locations in a radio frame are used to transmit paging messages.

(2): For a new radio (NR) system, a PF in which a paging message corresponding to any UE is located can be calculated according to the following formula (3), that is, an SFN of the PF is calculated according to formula (3). A PO that is used to transmit the paging message corresponding to the UE and that is in the PF can be calculated according to the foregoing formula (2), that is, an index number i_s of the PO can be calculated according to formula (2).

$$(\text{SFN}+\text{PF\_offset}) \bmod T = (T \text{ div } N) \times (\text{UE\_ID}/N) \qquad \text{Formula (3)}$$

T is used to represent a DRX period of the UE. If T is configured by an RRC or upper layer, T is determined based on the smallest value of specific DRX values of the UE and a default DRX value in a broadcast system message; and if T is not configured by the RRC or upper layer, a default value is used. N represents a quantity of PFs in a DRX period. PF_offset represents offset used to determine a PF.

It is specified in protocol (TS 38.331) that a value of N and a value of PF_offset are determined by a parameter n and paging message frame offset. System information block type 1 (SIB 1) carries Ns, n, PF offset, and a default DRX period length. SIB 1 further carries a monitoring occasion of a first physical downlink control channel (PDCCH) corresponding to a PO.

For an NR system, when a search space parameter for a monitored paging message is configured to: SearchSpaceID=0, Ns may be 1 or 2. When Ns equals to 1, one PF includes one PO, and the PO is a first PDCCH monitoring occasion for paging messages in the PF; and when Ns equals to 2, one PF includes two POs, the first PO is a first half of the PF, and the second PO is a second half of the PF. When the search space parameter for the monitored paging message is configured to not only SearchSpaceID=0 but also another SearchSpaceID value, the PO includes "s" PDCCH monitoring occasions, and the K-th PDCCH monitoring occasion of the PO is the K-th SSB. In case of an uplink symbol, the monitoring occasion skips the subframe and defers. If a first PDCCH monitoring occasion of a PO (firsPDCCH-MonitoringOccasionOfPO) is configured to H, the monitoring occasion is moved backwards by H PDCCH monitoring occasions.

S is determined based on a quantity of SSBs actually sent by the UE, that is, whether an SSB indicated by ssb-PositionsInBurst in SIB1 is actually sent affects the calculation of S.

For UE_ID, it should be noted that UE_ID may be IMSI mod 1024 in an LTE system, or may be 5G-S-IMSI mod 1024 in the NR system. If the UE does not have 5G-S-IMSI, for example, when the UE is not registered on a network, a value of UE_ID in the formula is 0 by default.

3. A synchronization signal & PBCH block (SSB) (SSB may also be referred to as SS Block) includes a primary synchronization signal (PSS), a secondary synchronization signal (SSS), a physical broadcast channel (PBCH), and a PBCH-DMRS.

4. Related Terms

In this specification, the term "and/or" is merely an association relationship that describes associated objects, and represents that there may be three relationships. For example, A and/or B may represent three cases: only A exists, both A and B exist, and only B exists. In addition, the character "/" in this specification generally indicates that associated objects are in an "or" relationship. In a formula, the character "/" indicates that associated objects are in a "divided" relationship. If not stated, "a plurality of" in this specification means two or more.

For ease of clearly describing the technical solutions in the embodiments of this application, in the embodiments of this application, the words "first" and "second" are used to distinguish between same or similar items with basically the same functions or effects. A person skilled in the art may understand that the words "first" and "second" do not limit a quantity and an execution sequence.

In the embodiments of this application, the term such as "exemplary" or "for example" is used to indicate an example, an instance, or a description. Any embodiment or design scheme described as "exemplary" or "an example" in the embodiments of this application should not be construed as being preferable or advantageous than other embodiments or design schemes. Optionally, the words such as "exemplary" or "for example" are used to present related concepts in a specific manner. In the description of the embodiments of this application, unless otherwise specified, the meaning of "a plurality of" means two or more.

The following describes the technical solutions in this application with reference to the accompanying drawings.

The technical solutions provided in this application may be applied to various communications systems, for example, a 5G communications system, a future evolved system, or a plurality of communications fusion systems. A plurality of application scenarios may be applied to, for example, machine to machine (M2M), D2M, macro-micro communication, enhanced mobile broadband (eMBB), Ultra-Reliable and Low Latency Communications (uRLLC), and massive machine type communication (mMTC). These scenarios include but are not limited to scenarios such as communication between terminal devices, communication between network devices, or communication between a network device and a terminal device. The embodiments of this application may be applied to communication between a network device and a terminal device in the 5G communications system, communication between terminal devices, or communication between network devices. The foregoing network devices may include a core network device and a RAN device.

FIG. 1 is a possible schematic structural diagram of a communications system according to an embodiment of this application. As shown in FIG. 1, the communications system includes: at least one piece of UE 101 (including at least one SIM card) (UE 1, UE 2, . . . , and UE m in FIG. 1), at least one RAN device 102 (RAN device 1. RAN device 2, . . . , and RAN device n in FIG. 1), and a core network device 103, where the core network device 103 is connected to all RAN devices, and each RAN device is connected to at least one piece of UE (as shown in FIG. 1, RAN device 1 is connected to UE1, and RAN device 2 is connected to UE2 and UE3), and each UE can be connected to either RAN device 102 or core network device 103.

For example, as shown in FIG. 1, UE1 in FIG. 1 is multi-card UE, that is, UE1 includes at least SIM card 1 and SIM card 2 (only SIM card 1 and SIM card 2 are shown in the figure), and UE1 is connected to RAN device 1 and the core network device, respectively. Optionally, when the core network device wants to page UE 1, it sends indication information to RAN device 1; and after receiving the indication information, the RAN device sends a paging message to UE1 in a target transmission manner.

The foregoing core network device 103 may be an access and mobility management function (AMF) node device, a mobility management entity (MME) node device, or another node device.

The foregoing RAN device 102 may be a base transceiver station (BTS) in a global system for mobile communication (G GSM) or a code division multiple access (CDMA) network, may be an NB (NodeB) in a wideband code division multiple access (WCDMA) system, or may be an eNB or an eNodeB (evolutional NodeB) in an LTE system. The RAN device may be alternatively a wireless controller in a cloud radio access network (CRAN) scenario. The RAN device may be alternatively a network device in the 5G communications system or a network device in a future evolved network. However, the use of words does not constitute a limitation on this application.

UE 101 may be either a wireless terminal or a wired terminal. The wireless terminal may be a device configured to provide voice and/or other business data connectivity to a user, such as handheld devices with wireless communication functions, computing devices or other processing devices connected to wireless modems, on-board devices, wearable devices, terminals in future 5G networks, or terminals in future evolving PLMN networks, and the like. The wireless terminal may communicate with one or more core networks by using a radio access network. The wireless terminal may be a mobile terminal, such as a mobile phone (or referred to as a "cellular" phone) and a computer with a mobile terminal. For example, the wireless terminal may be a portable, pocket-sized, handheld, computer built-in, or in-vehicle mobile apparatus that exchanges voice and/or data with a radio access network, and/or a device such as a personal communication service (PCS) phone, a cordless phone, a session initiation protocol (SIP) phone, a wireless local loop (WLL) station, or a personal digital assistant (PDA). The wireless terminal may be alternatively a mobile device, user equipment, a UE terminal, an access terminal, a wireless communications device, a terminal unit, a terminal station, a mobile station, a mobile console, a remote station, a remote terminal, a subscriber unit, a subscriber station, a user agent, a terminal apparatus, or the like. As an example, in this embodiment of this application, a mobile phone is shown as an example of the UE in FIG. 1.

A main feature of multi-card UE is that it can camp in a plurality of communications systems at the same time. One type of multi-card UE can camp in a plurality of communications systems at the same time for data sending and receiving, and the receiving and sending do not affect each other. Another type of multi-card UE can camp in a plurality of communications systems, but camps in different communications systems in time-division mode. For example, the UE camps in communications system 1 in time period 1 to monitor paging messages, and camps in communications system 2 in time period 2 to monitor paging messages.

However, when multi-card UE camps in a plurality of communications systems in time-division mode, if transmission locations of paging messages in different communications systems overlap, paging messages in one or more communications systems may be lost.

The paging message transmission method of the embodiments of this application is described below with reference to FIG. 2. FIG. 2 is a schematic flowchart of interaction of a paging message transmission method according to an embodiment of this application. As shown in FIG. 2, the paging message transmission method may include steps 201 to 203:

Step 201: A core network device sends indication information to a RAN device.

Correspondingly, the RAN device receives the indication information from the core network device.

In this embodiment of this application, the indication information is used to indicate a target transmission manner; the indication information is further used to instruct the RAN device to send a first paging message to UE in the target transmission manner, where the UE is multi-card UE, that is, the UE includes M SIM cards, where M is an integer greater than 1.

In this embodiment of this application, the first paging message includes paging messages corresponding to N SIM cards, where N is a positive integer, and N is less than or equal to M.

In an example, the N SIM cards are SIM cards that are of the M SIM cards of the UE and whose paging message transmission locations are overlapped with those of other SIM cards. For example, the UE is multi-card UE including SIM card 1, SIM card 2 and SIM card 3. If a paging message transmission location of SIM card 1 is overlapped with that of SIM card 2, the network device may send a paging message of SIM card 1 and/or that of SIM card 2 to the UE in transmission manner 1.

For example, in a scenario, for the first paging message transmitted in the target transmission manner, transmission locations of some or all of paging messages corresponding to different SIM cards are different, that is, a transmission location of at least one paging message that corresponds to any of the N SIM cards and that is transmitted in transmission manner 1 is different from that of a paging message corresponds to another SIM card.

Optionally, in this embodiment of this application, in a case where the UE is inactive, the indication information is sent by the core network device to the RAN device before the UE enters an inactive period, that is, in a case where the UE is inactive, Step 201 may include the following steps:

Step 201 *a*: The core network device sends the indication information to the RAN device before the UE enters the inactive state.

For example, when a core network node determines that it is required to trigger the RAN device to send the paging message of the UE, the paging message of the UE may be transmitted from an anchor node to other node in an inactive paging message area of the UE through an inter-network interface.

Step 202: The RAN device sends a first paging message to UE in a target transmission manner.

For example, when it is required to page the UE, the core network device may send the indication information to a RAN device corresponding to the UE, so that the RAN device can determine the target transmission manner based on the indication information, and send the first paging message to the UE in the target transmission manner.

Step 203: The UE receives the first paging message from the RAN device in the target transmission manner.

It should be noted that the UE can determine the target transmission manner according to relevant parameters of the UE or according to an agreed protocol, which is not specifically limited in the embodiment of this application.

Optionally, in this embodiment of this application, the target transmission manner includes at least one of the following: for a second paging message corresponding to one SIM card, 1) retransmitting the second paging message at X first transmission locations; 2) transmitting the second paging message in an offset manner based on a predetermined offset and/or in a predetermined offset direction; 3)

transmitting the second paging message at a second transmission location. The second transmission location is different from the original transmission location that is used to transmit the second paging message. X is an integer greater than 1. The second paging message corresponding to the one SIM card may indicate all paging messages of the SIM card.

It should be noted that, the foregoing three transmission manners may be implemented independently or implemented in combination with each other. This is not limited in this application.

(1): The Retransmitting the Second Paging Message at X First Transmission Locations May be Implemented in at Least the Two Manners Below:

In a first possible implementation, retransmitting the second paging message at the X first transmission locations based on a first identifier corresponding to the UE, where the first identifier is used to indicate a third transmission location that is in a radio frame and that is used to transmit paging messages, and Ns in this specification, that is, the X first transmission locations are X third transmission locations in at least one first radio frame.

In an example, the X first transmission locations are X third transmission locations in at least one first radio frame.

For example, Ns is used as the first identifier corresponding to the UE for description.

Example 1: When Ns equals to 1, each radio frame has only one transmission location 1 for transmitting paging messages. In this case, the RAN device may choose transmission locations 1 in at least two radio frames for transmitting the second paging message.

Example 2: When Ns equals to 2, each radio frame has two transmission locations 2 for transmitting paging messages. In this case, the RAN device may choose some or all transmission locations 2 in each of at least one radio frame for transmitting the second paging message.

For example, when Ns equals to 4, that the RAN device chooses the original transmission location of the second paging message is used as an example, if the radio frame having the original transmission location is radio frame K, the RAN device may choose transmission locations corresponding to $i\_s=0$ and $i\_s=2$ in radio frame K to repeatedly transmit the second paging message; or, the RAN device may choose transmission locations corresponding to $i\_s=0$ and $i\_s=3$ in radio frame K to repeatedly transmit the second paging message; or the RAN device may choose transmission locations corresponding to $i\_s=1$ and $i\_s=2$ in radio frame K to repeatedly transmit the second paging message; or, the RAN device may choose transmission locations corresponding to $i\_s=1$ and $i\_s=3$ in radio frame K to repeatedly transmit the second paging message; or the RAN device may choose transmission locations corresponding to $i\_s=2$ and $i\_s=3$ in radio frame K to repeatedly transmit the second paging message; or, the RAN device may choose transmission locations corresponding to $i\_s=0$, $i\_s=1$, and $i\_s=2$ in radio frame K to repeatedly transmit the second paging message; or the RAN device may choose transmission locations corresponding to $i\_s=0$, $i\_s=2$, and $i\_s=3$ in radio frame K to repeatedly transmit the second paging message; or, the RAN device may choose transmission locations corresponding to $i\_s=1$, $i\_s=2$, and $i\_s=3$ in radio frame K to repeatedly transmit the second paging message; or the RAN device may choose transmission locations corresponding to $i\_s=0$, $i\_s=1$, $i\_s=2$, and $i\_s=3$ in radio frame K to repeatedly transmit the second paging message.

In a second possible implementation, the X first transmission locations are X transmission locations that are in at least one first radio frame and that are used to transmit paging messages; the at least one first radio frame at least includes a target radio frame, the target radio frame is a radio frame adjacent to a second radio frame and/or a radio frame spaced from the second radio frame by at least one radio frame; and the second radio frame is an original radio frame used to transmit the second paging message. It should be noted that, the radio frame adjacent to the second radio frame includes a radio frame adjacently before the second radio frame and/or a radio frame adjacently behind the second radio frame.

For example, if a radio frame that has the original transmission location of the second paging message is radio frame K, and a preset quantity of repetition times is 2, the second paging message can be transmitted repeatedly at transmission location 1 of radio frame K and transmission location 1 of radio frame K+1, or transmitted repeatedly at transmission location 1 of radio frame K and transmission location 1 of radio frame K−1.

(2): For a Transmission Manner in which the Second Paging Message is Transmitted at the Second Transmission Location:

In an example, the second transmission location is a transmission location that is in a target radio frame and that is used to transmit paging messages; the target radio frame is a radio frame adjacent to a second radio frame or a radio frame spaced from the second radio frame by at least one radio frame; and the second radio frame is an original radio frame used to transmit the second paging message.

In another example, the second transmission location is a predetermined transmission location, and the predetermined transmission location is predefined, specified in a protocol, or preconfigured in a network. For example, the second transmission location is such a special location that is generally not a location of a subframe in which a system message is located, to prevent the paging message from conflicting with the system message.

It should be noted that, the predetermined transmission location is predefined, specified in a protocol, or preconfigured in a network.

It should be noted that, when there are a plurality of the foregoing second transmission locations, the second transmission manner in which the second paging message is transmitted at the second transmission location is another special repeated transmission manner.

Optionally, in this embodiment of this application, for a paging message of one SIM card, the indication information includes an identifier of a target SIM card; and the target SIM card includes the one SIM card and a SIM card that is in the UE and that has an association relationship with the one SIM card.

For example, if IMSI 1 of SIM card 1 of the UE is bound to IMSI 2 of SIM card 2, when a core network device wants to page SIM card 1 of the UE, it sends IMSI1 and SIM card 2 to the RAN device to instruct the RAN device to perform paging message enhancement on a paging message of SIM card 1. The RAN device sends the paging message at both paging message transmission locations of SIM card 1 and SIM card 2.

It should be noted that the association relationship may be stored in the core network device, RAN device, and UE, respectively.

Optionally, in this embodiment of this application, that a core network device sends indication information to a RAN device may be implemented in two manners:

Possible Implementation 1:

For example, in this embodiment of this application, the following Step A1 may be further included before Step 201:

Step A1: The core network device receives first information from the UE.

With reference to Step A1, Step 201 may include the following Step A2:

Step A2: The core network device sends the indication information to the RAN device based on the first information.

The first information is used to indicate the first transmission manner.

Optionally, the first information is used to indicate at least one of the following: (1) that the UE includes the M SIM cards; (2) whether radio access technologies (RATs) of at least two of the M SIM cards are the same; (3) whether operators of at least two of the M SIM cards are the same; or (4) whether transmission locations of paging messages corresponding to at least two of the M SIM cards overlap.

For example, there may be at least the following two cases for the fourth type of the information: (1) a transmission location of a paging message corresponding to at least one SIM card in a connected state overlaps with that of a paging message corresponding to at least one SIM card in an idle state; (2) transmission locations of paging messages corresponding to at least two SIM cards in the idle state overlap with each other.

For example, the core network device determines overlapping status of paging message transmission locations of multiple SIM cards of the UE according to the first information, and then determines, based on different overlapping scenarios, a paging message transmission manner when paging message the UE.

Example 1: Before Step A1, the paging message transmission method in this embodiment of this application further includes Steps A11 and Step A12:

Step A11: The RAN device receives the first information from the UE.

Step A12: The RAN device sends the first information to the core network device.

Example 2: Before Step A1, the paging message transmission method in this embodiment of this application further includes Step A13:

Step A13: The UE sends the first information to the core network device.

Possible Implementation 2:

For example, in this embodiment of this application, the method further includes the following Step B1 before Step 201:

Step B1: The core network device receives second information from the RAN device.

The second information is a parameter used to determine a monitoring occasion for a paging message in a cell controlled by the RAN device.

Optionally, the second information includes at least one of the following: (1) a first quantity; (2) "firsPDCCH-MonitoringOccasionOfPO", that is, a first PDCCH monitoring occasion corresponding to a paging occasion; 3) "nAndPagingFrameOffset" (PF_Offset for short), that is, offset of a monitored paging message in the cell controlled by the RAN device at the monitoring occasion; 4) configuration information of a discontinuous reception (DRX) period of the cell controlled by the RAN device; 5) a quantity of SSBs in the cell controlled by the RAN device; 6) a parameter used to indicate whether all SSBs or partial SSBs in the cell controlled by the RAN device are sent; 7) a subcarrier interval of the cell controlled by the RAN device; or 8) an identifier of the cell controlled by the RAN device.

With reference to Step A1, Step 201 may be performed via the following Step B2:

Step B2: If it is determined, based on the second information and identifiers of the M SIM cards, that the first paging message is transmitted in the target transmission manner, the core network device sends the indication information to the RAN device.

For example, after receiving the second information, the core network device calculates a transmission location of a paging message corresponding to each SIM card based on the second information and the identifiers of the M SIM cards. Then, it can determine, based on the transmission locations of the paging messages corresponding to the SIM cards, whether transmission locations overlap, and further determine the target transmission manner based on the overlapping status.

According to the paging message transmission method in this embodiment of this application, after receiving the indication information from the core network device, the RAN device can send the first paging message (including the paging messages corresponding to the N SIM cards) to the UE in the target transmission manner based on the indication information. Because the target transmission manner includes at least one of the following: for the second paging message of the one SIM card, retransmitting the second paging message at the X first transmission locations, transmitting the second paging message in the offset manner based on the predetermined offset and/or in the predetermined offset direction, or transmitting the second paging message at the second transmission location, a transmission location of the second paging message is changed or increased. Therefore, a problem that a paging message is lost because transmission locations of paging messages overlap when multi-card UE monitors paging messages of different SIM cards is avoided, which improves communication efficiency.

Figure 3:
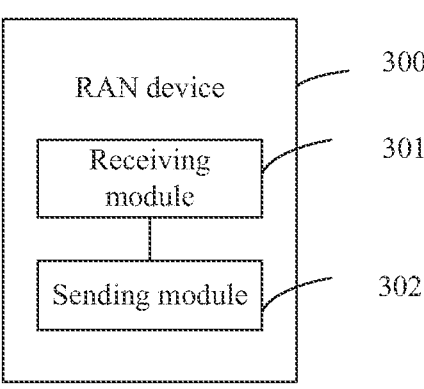
FIG. 3 is a possible schematic structural diagram of a RAN device according to an embodiment of this application.

FIG. 3 is a possible schematic structural diagram of a RAN device according to an embodiment of this application. As shown in FIG. 3, the RAN device 300 includes a receiving module 301 and a sending module 302. The receiving module 301 is configured to receive indication information from a core network device, where the indication information is used to indicate a target transmission manner. The sending module is configured to send a first paging message to UE in the target transmission manner, where the UE includes M SIM cards, the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, M and X are integers greater than 1, N is a positive integer, and N is less than or equal to M.

Optionally, the receiving module 301 is further configured to receive first information from the UE, and the sending module 302 is further configured to send the first information received by the receiving module to the core network device, where the first information is used to indicate the target transmission manner; and the first information is used to indicate at least one of the following: that the UE includes the M SIM cards, whether RATs of at least two of the M SIM cards are the same, whether operators of at least two of the M SIM cards are the same, or whether transmission locations of paging messages corresponding to at least two of the M SIM cards overlap.

Optionally, in a case where the UE is inactive, the indication information is sent by the core network device to the RAN device 300 before the UE enters an inactive period.

Optionally, the sending module 302 is further configured to send second information to the core network device, where the second information is a parameter used to determine a monitoring occasion for a paging message in a cell controlled by the RAN device; the second information includes at least one of the following: a first quantity, a monitoring occasion for a first physical downlink control channel (PDCCH) corresponding to a paging occasion, offset of the monitoring occasion for the paging message in the cell controlled by the RAN device, configuration information of a discontinuous reception (DRX) period of the cell, a quantity of SSBs in the cell controlled by the RAN device, a parameter used to indicate whether all SSBs or partial SSBs in the cell controlled by the RAN device are sent, a subcarrier spacing of the cell controlled by the RAN device, or an identifier of the cell controlled by the RAN device; and the first quantity is a quantity of transmission locations used to transmit paging messages in a radio frame in the cell controlled by the RAN device.

Optionally, the retransmitting the second paging message at X first transmission locations includes: retransmitting the second paging message at the X first transmission locations based on a first identifier corresponding to the UE, where the first identifier is used to indicate a third transmission location that is in a radio frame and that is used to transmit paging messages, and the X first transmission locations are X third transmission locations in at least one radio frame.

Optionally, the X first transmission locations are X transmission locations that are in at least one first radio frame and that are used to transmit paging messages; the at least one first radio frame at least includes a target radio frame; the target radio frame is a radio frame adjacent to a second radio frame or a radio frame spaced from the second radio frame by at least one radio frame; and the second radio frame is an original radio frame used to transmit the second paging message.

Optionally, the second transmission location is a transmission location that is in a target radio frame and that is used to transmit paging messages; the target radio frame is a radio frame adjacent to a second radio frame or a radio frame spaced from the second radio frame by at least one radio frame; and the second radio frame is an original radio frame used to transmit the second paging message.

Optionally, the second transmission location is a predetermined transmission location, and the predetermined transmission location is predefined, specified in a protocol, or preconfigured in a network.

Optionally, for a paging message of one SIM card, the indication information includes an identifier of a target SIM card; and the target SIM card includes the one SIM card and a SIM card that is in the UE and that has an association relationship with the one SIM card.

The RAN device 300 provided in this embodiment of this application can implement the processes that are implemented by the RAN device 300 in the foregoing method embodiments. To avoid repetition, details are not described herein again.

According to the RAN device in this embodiment of this application, after receiving the indication information from the core network device, the RAN device can send the first paging message (including the paging messages corresponding to the N SIM cards) to the UE in the target transmission manner based on the indication information. Because the target transmission manner includes at least one of the following: for the second paging message of the one SIM card, retransmitting the second paging message at the X first transmission locations, transmitting the second paging message in the offset manner based on the predetermined offset and/or in the predetermined offset direction, or transmitting the second paging message at the second transmission location, a transmission location of the second paging message is changed or increased. Therefore, a problem that a paging message is lost because transmission locations of paging messages overlap when multi-card UE monitors paging messages of different SIM cards is avoided, which improves communication efficiency.

Figure 4:
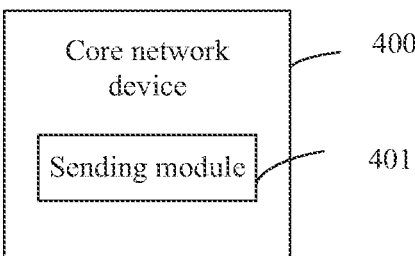
FIG. 4 is a possible schematic structural diagram of a core network device according to an embodiment of this application.

FIG. 4 is a possible schematic structural diagram of a core network device according to an embodiment of this application. As shown in FIG. 4, the core network device 400 includes a sending module 401. The sending module 401 is configured to send indication information to a radio access network (RAN) device, where the indication information is used to indicate the target transmission mode and is also used to instruct the RAN device to send a first paging message to the UE in the target transmission manner, the UE includes M SIM cards, the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, M and X are integers greater than 1, N is a positive integer, and N is less than or equal to M.

Figure 5:
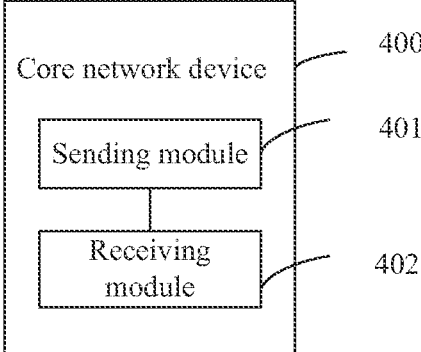
FIG. 5 is another possible schematic structural diagram of a core network device according to an embodiment of this application.

Optionally, with reference to FIG. 4, as shown in FIG. 5, the core network device 400 further includes a receiving module 402. The receiving module 402 is configured to receive first information from the UE, and the sending module 401 may be configured to send indication information to the RAN device based on the first information received by the receiving module 402, where the first information is used to indicate the target transmission manner; and the first information is used to indicate at least one of the following: that the UE includes the M SIM cards, whether RATs of at least two of the M SIM cards are the same, whether operators of at least two of the M SIM cards are the same, or whether transmission locations of paging messages corresponding to at least two of the M SIM cards overlap.

Optionally, the sending module 401 may be configured to: in a case where the UE is inactive, send the indication information to the RAN device before the UE enters an inactive period.

Optionally, as shown in FIG. 5, the core network device 400 further includes a receiving module 402. The receiving module 402 is configured to receive second information from the RAN device. The sending module 401 may be configured to: if it is determined, based on the second information received by the receiving module 402 and identifiers of the M SIM cards, that the first paging message is transmitted in the target transmission manner, send the indication information to the RAN device, where the second information is a parameter used to determine a monitoring occasion for a paging message in a cell controlled by the RAN device; the second information includes at least one of the following: a first quantity, a monitoring occasion for a first physical downlink control channel (PDCCH) corresponding to a paging occasion, offset of the monitoring occasion for the paging message in the cell, configuration information of a discontinuous reception (DRX) period of the cell, a quantity of SSBs in the cell, a parameter used to indicate whether all SSBs or partial SSBs in the cell are sent, a subcarrier spacing of the cell, and an identifier of the cell; or the first quantity is a quantity of transmission locations used to transmit paging messages in a radio frame in the cell.

Optionally, the retransmitting the second paging message at X first transmission locations includes: retransmitting the second paging message at the X first transmission locations based on a first identifier corresponding to the UE, where the first identifier is used to indicate a third transmission location that is in a radio frame and that is used to transmit paging messages, and the X first transmission locations are X third transmission locations in at least one first radio frame.

Optionally, the X first transmission locations are X transmission locations that are in at least one first radio frame and that are used to transmit paging messages, the at least one first radio frame at least includes a target radio frame; the target radio frame is a radio frame adjacent to a second radio frame or a radio frame spaced from the second radio frame by at least one radio frame; and the second radio frame is an original radio frame used to transmit the second paging message.

Optionally, the second transmission location is a transmission location that is in a target radio frame and that is used to transmit paging messages; the target radio frame is a radio frame adjacent to a second radio frame or a radio frame spaced from the second radio frame by at least one radio frame, and the second radio frame is an original radio frame used to transmit the second paging message.

Optionally, the second transmission location is a predetermined transmission location, and the predetermined transmission location is predefined, specified in a protocol, or preconfigured in a network.

Optionally, for a paging message of one SIM card, the indication information includes an identifier of a target SIM card; and the target SIM card includes the one SIM card and a SIM card that is in the UE and that has an association relationship with the one SIM card.

The core network device 400 provided in this embodiment of the application can implement the processes that are implemented by the core network device in the foregoing method embodiments. To avoid repetition, details are not described herein again.

According to the core network device in this embodiment of this application, when the core network device needs to page the UE, it sends the indication information to the RAN device, so as to instruct the RAN device to send the first paging message (including the paging messages corresponding to the N SIM cards) to the UE in the target transmission manner based on the indication information. Because the target transmission manner includes at least one of the following: for the second paging message of the one SIM card, retransmitting the second paging message at the X first transmission locations, transmitting the second paging message in the offset manner based on the predetermined offset and/or in the predetermined offset direction, or transmitting the second paging message at the second transmission location, a transmission location of the second paging message is changed or increased. Therefore, a problem that a paging message is lost because transmission locations of paging messages overlap when multi-card UE monitors paging messages of different SIM cards is avoided, which improves communication efficiency.

Figure 6:
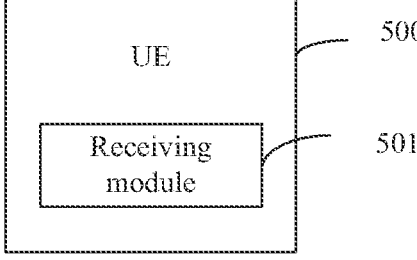
FIG. 6 is a possible schematic structural diagram of UE according to an embodiment of this application.

FIG. 6 is a possible schematic structural diagram of UE according to an embodiment of this application. As shown in FIG. 6, the UE 500 includes M SIM cards, where M is an integer greater than 1. The UE 500 includes a receiving module 501. The receiving module 501 is configured to receive a first paging message from a RAN device in a target transmission manner, where the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message. N is a positive integer, X is an integer greater than 1, and N is less than or equal to M.

Figure 7:
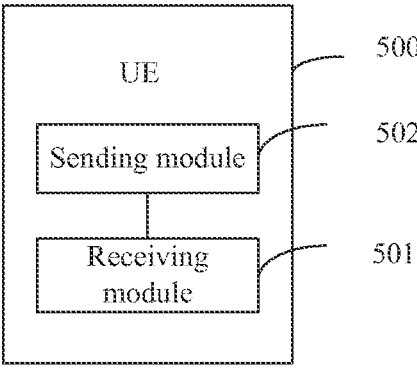
FIG. 7 is another possible schematic structural diagram of UE according to an embodiment of this application.

Optionally, with reference to FIG. 6, as shown in FIG. 7, the UE 500 further includes a sending module 502. The sending module 502 is configured to send first information to the RAN device or a core network device, where the first information is used to indicate the target transmission manner; and the first information is used to indicate at least one of the following: that the UE 500 includes the M SIM cards, whether RATs of at least two of the M SIM cards are the same, whether operators of at least two of the M SIM cards are the same, or whether transmission locations of paging messages corresponding to at least two of the M SIM cards overlap.

Optionally, the retransmitting the second paging message at X first transmission locations includes: retransmitting the second paging message at the X first transmission locations based on a first identifier corresponding to the UE 500, where the first identifier is used to indicate a third transmission location that is in a radio frame and that is used to transmit paging messages, and the X first transmission locations are X third transmission locations in at least one first radio frame.

Optionally, the X first transmission locations are X transmission locations that are in at least one first radio frame and that are used to transmit paging messages, the at least one first radio frame at least includes a target radio frame; the target radio frame is a radio frame adjacent to a second radio frame or a radio frame spaced from the second radio frame by at least one radio frame; and the second radio frame is an original radio frame used to transmit the second paging message.

Optionally, the second transmission location is a transmission location that is in a target radio frame and that is used to transmit paging messages; the target radio frame is a radio frame adjacent to a second radio frame or a radio frame spaced from the second radio frame by at least one radio frame; and the second radio frame is an original radio frame used to transmit the second paging message.

Optionally, the second transmission location is a predetermined transmission location, and the predetermined transmission location is predefined, specified in a protocol, or preconfigured in a network.

The UE 500 provided in this embodiment of the present invention can implement the processes implemented by the UE in the foregoing method embodiments. To avoid repetition, details are not described herein again.

According to the UE in this embodiment of this application, the UE includes multiple SIM cards, that is, the UE is multi-card UE, and may receive the first paging message (including the paging messages corresponding to the N SIM cards) from the RAN device in the target transmission manner. Because the target transmission manner includes at least one of the following: for the second paging message of the one SIM card, retransmitting the second paging message at the X first transmission locations, transmitting the second paging message in the offset manner based on the predetermined offset and/or in the predetermined offset direction, or transmitting the second paging message at the second transmission location, a transmission location of the second paging message is changed or increased. Therefore, a problem that a paging message is lost because transmission locations of paging messages overlap when multi-card UE monitors paging messages of different SIM cards is avoided, which improves communication efficiency.

Figure 8:
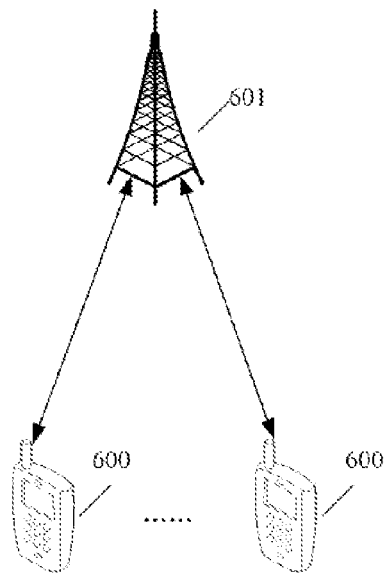
FIG. 8 is another possible schematic structural diagram of a communications system according to an embodiment of this application.

FIG. 8 is a possible schematic structural diagram of a communications system according to an embodiment of this application. As shown in FIG. 8, the communications system includes at least one piece of UE 600 (including at least one SIM card) and a network device 601.

The network device 601 may be an AMF node device, an MME node device, or another node device, or may be a BTS in a GSM or CDMA network, an NB (NODEB) in a WCDMA system, or an eNB or eNodeB in an LTE system. The network device may alternatively be a wireless controller in a CRAN scenario. The network device 601 may be alternatively a network device in the 5G communications system or a network device in a future evolved network. However, the use of words does not constitute a limitation on this application.

UE 600 may be either a wireless terminal or a wired terminal. The wireless terminal may be a device configured to provide voice and/or other business data connectivity to a user, such as handheld devices with wireless communication functions, computing devices or other processing devices connected to wireless modems, on-board devices, wearable devices, terminals in future 5G networks, or terminals in future evolving PLMN networks, and the like. The wireless terminal may communicate with one or more core networks by using a RAN. The wireless terminal may be a mobile terminal, such as a mobile phone (or referred to as a "cellular" phone) and a computer with a mobile terminal. For example, the wireless terminal may be a portable, pocket-sized, handheld, computer built-in, or in-vehicle mobile apparatus that exchanges voice and/or data with the RAN, and/or a device such as a PCS phone, a cordless phone, an SIP phone, a WLL station, or a PDA. The wireless terminal may be alternatively a mobile device, UE, a UE terminal, an access terminal, a wireless communications device, a terminal unit, a terminal station, a mobile station, a mobile console, a remote station, a remote terminal, a subscriber unit, a subscriber station, a user agent, a terminal apparatus, or the like. In an example, in this embodiment of this application, a mobile phone is shown as an example of the UE in FIG. 8.

Figures 9, 10, 11:
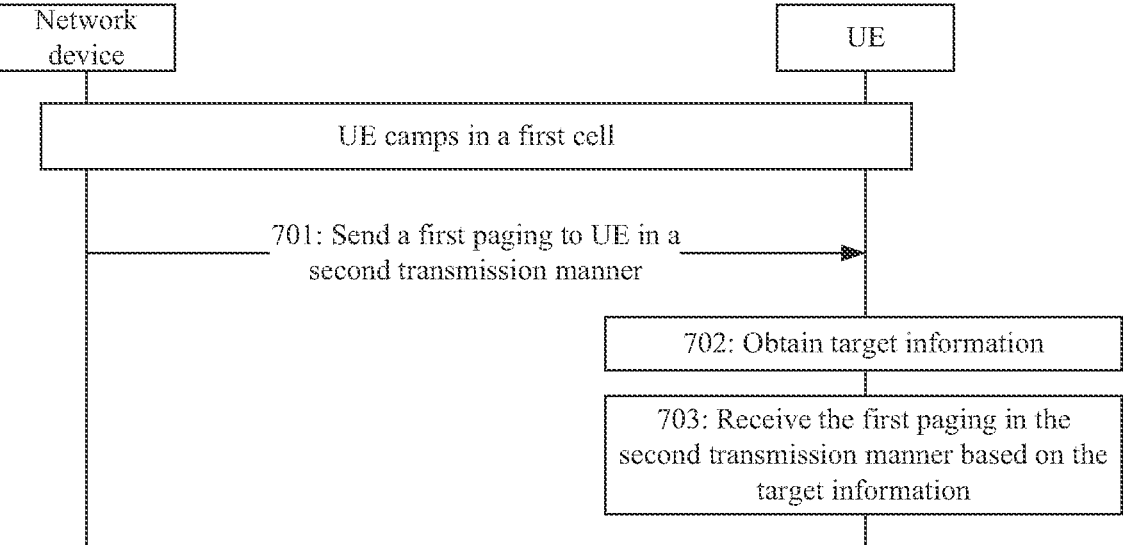
FIG. 9 is a schematic flowchart of a paging message transmission method according to an embodiment of this application.
FIG. 10 is still another possible schematic structural diagram of UE according to an embodiment of this application.
FIG. 11 is a possible schematic structural diagram of a network device according to an embodiment of this application.

FIG. 9 is a schematic flowchart of a paging message transmission method according to an embodiment of this application. As shown in FIG. 9, the paging message transmission method may include the following steps:

Step 701: A network device sends a first paging message to UE in a second transmission manner in a case where the UE camps in a first cell.

In this embodiment of this application, the UE is multi-card UE, that is, the UE includes M SIM cards, where M is an integer greater than 1.

In this embodiment of this application, the first paging message includes paging messages corresponding to N SIM cards, where N is a positive integer, and N is less than or equal to M.

In an example, the N SIM cards are SIM cards that are of the M SIM cards of the UE and whose paging message transmission locations are overlapped with those of other SIM cards. For example, the UE is multi-card UE including SIM card 1, SIM card 2 and SIM card 3. If a paging message transmission location of SIM card 1 is overlapped with that of SIM card 2, the network device may send a paging message of SIM card and/or that of SIM card 2 to the UE in a first transmission manner.

For example, in a scenario, for the first paging message transmitted in the first transmission manner, transmission locations of some or all of paging messages corresponding to different SIM cards are different, that is, a transmission location of at least one paging message that corresponds to any of the N SIM cards and that is transmitted in the first transmission manner is different from that of a paging message corresponds to another SIM card.

Step 702: UE obtains target information when it camps in the first cell.

The target information is used to indicate whether the first cell supports and/or uses the first transmission manner for transmitting paging messages.

Optionally, in this embodiment of this application, the target information is carried in a broadcast message of the first cell, that is, whether the first cell supports and/or uses the first transmission manner for transmitting paging messages is broadcast in the broadcast message of the first cell. The UE can obtain the target information after reading the broadcast message broadcast by the first cell, so as to learn whether the first cell supports and/or uses the first transmission manner for transmitting paging messages. In addition, the target information may alternatively be carried in downlink control information (DCI), a physical downlink shared channel (PDSCH), or a media access control control element (MAC CE).

It should be noted that, that the target information is carried in the broadcast message of the first cell is only an example. In actual application, it may alternatively be carried in other information broadcast by the first cell. This is not limited in this application.

Optionally, in this embodiment of this application, the target information includes a transmission parameter for transmitting paging messages in the first transmission manner. For example, the transmission parameter includes: offset to an original transmission location for transmitting the paging message or a transmission location where the paging message is transmitted repeatedly. The original transmission location may be an original subframe, original radio frame, original paging occasion, or the like.

It should be noted that a performing sequence of Step 701 and Step 702 is not limited in this application. In actual application, Step 701 may be performed before Step 702 or after Step 702. Certainly. Step 701 and Step 702 may be performed simultaneously. This is not limited in this application.

Step 703: The UE receives the first paging message in the second transmission manner based on the target information.

Correspondingly, a peer-end network device sends the first paging message to the UE in the second transmission manner.

Optionally, in this embodiment of this application, in a case where the target information is used to indicate that the first cell supports or uses the first transmission manner for transmitting paging messages, the second transmission manner is the first transmission manner; or in a case where the target information is used to indicate that the first cell does not support or use the first transmission manner for transmitting paging messages, or in a case where the target information is used to indicate that the first cell supports the first transmission manner for transmitting paging messages but does not use the first transmission manner for transmitting paging messages, the second transmission manner is a non-first transmission manner.

It should be noted that, in this embodiment of this application, the non-first transmission manner is a transmission manner different from the first transmission manner.

Optionally, in this embodiment of this application, in a case where the second transmission manner is the first transmission manner, that is, in a case where the target information is used to indicate that the first cell supports or uses the first transmission manner for transmitting paging messages, the target information may be used to directly indicate the first transmission manner, so that the UE can directly learn that the first cell chooses which first transmission manner for transmitting paging messages.

Optionally, in this embodiment of this application, the first transmission manner includes at least one of the following: for a second paging message corresponding to one SIM card, 1) retransmitting the second paging message at X first transmission locations: 2) transmitting the second paging message in an offset manner based on a predetermined offset and/or in a predetermined offset direction; 3) transmitting the second paging message at a second transmission location. The second transmission location is different from the original transmission location that is used to transmit the second paging message. X is an integer greater than 1. The second paging message corresponding to the one SIM card may indicate all paging messages of the SIM card.

It should be noted that, the foregoing three transmission manners may be implemented independently or implemented in combination with each other. This is not limited in this application.

(1): The Retransmitting the Second Paging Message at X First Transmission Locations May be Implemented in at Least the Two Manners Below:

In a first possible implementation, retransmitting the second paging message at the X first transmission locations based on a first identifier corresponding to the UE, where the first identifier is used to indicate a third transmission location that is in a radio frame and that is used to transmit paging messages, and Ns in this specification, that is, the X first transmission locations are X third transmission locations in at least one first radio frame.

For example, Ns is used as the first identifier corresponding to the UE for description.

Example 1: When Ns equals to 1, each radio frame has only one transmission location 1 for transmitting paging messages. In this case, the RAN device may choose transmission locations 1 in at least two radio frames for transmitting the second paging message.

Example 2: When Ns equals to 2, each radio frame has two transmission locations 2 for transmitting paging messages. In this case, the RAN device may choose some or all transmission locations 2 in each of at least one radio frame for transmitting the second paging message.

For example, when Ns equals to 4, that the RAN device chooses the original transmission location of the second paging message is used as an example, if the radio frame having the original transmission location is radio frame K, the RAN device may choose transmission locations corresponding to i_s=0 and i_s=2 in radio frame K to repeatedly transmit the second paging message; or, the RAN device may choose transmission locations corresponding to i_s=0 and i_s=3 in radio frame K to repeatedly transmit the second paging message; or the RAN device may choose transmission locations corresponding to i_s=1 and i_s=2 in radio frame K to repeatedly transmit the second paging message; or, the RAN device may choose transmission locations corresponding to i_s=1 and i_s=3 in radio frame K to repeatedly transmit the second paging message; or the RAN device may choose transmission locations corresponding to i_s=2 and i_s=3 in radio frame K to repeatedly transmit the second paging message; or, the RAN device may choose transmission locations corresponding to i_s=0, i_s=1, and i_s=2 in radio frame K to repeatedly transmit the second paging message; or the RAN device may choose transmission locations corresponding to i_s=0, i_s=2, and i_s=3 in radio frame K to repeatedly transmit the second paging message; or, the RAN device may choose transmission locations corresponding to i_s=1, i_s=2, and i_s=3 in radio frame K to repeatedly transmit the second paging message; or the RAN device may choose transmission locations corresponding to i_s=0, i_s=1, i_s=2, and i_s=3 in radio frame K to repeatedly transmit the second paging message.

In a second possible implementation, the X first transmission locations are X transmission locations that are in at least one first radio frame and that are used to transmit paging messages; the at least one first radio frame at least includes a target radio frame; the target radio frame is a radio frame adjacent to a second radio frame and/or a radio frame spaced from the second radio frame by at least one radio frame; and the second radio frame is an original radio frame used to transmit the second paging message. It should be noted that, the radio frame adjacent to the second radio frame includes a radio frame adjacently before the second radio frame and/or a radio frame adjacently behind the second radio frame.

For example, if a radio frame that has the original transmission location of the second paging message is radio frame K, and a preset quantity of repetition times is 2, the second paging message can be transmitted repeatedly at transmission location 1 of radio frame K and transmission location 1 of radio frame K+1, or transmitted repeatedly at transmission location 1 of radio frame K and transmission location 1 of radio frame K−1.

(2): For a Transmission Manner in which the Second Paging Message is Transmitted at the Second Transmission Location:

In an example, the second transmission location is a transmission location that is in a target radio frame and that is used to transmit paging messages; the target radio frame is a radio frame adjacent to a second radio frame or a radio frame spaced from the second radio frame by at least one radio frame; and the second radio frame is an original radio frame used to transmit the second paging message.

In another example, the second transmission location is a predetermined transmission location, and the predetermined transmission location is predefined, specified in a protocol, or preconfigured in a network. For example, the second transmission location is such a special location that is generally not a location of a subframe in which the broadcast message is located, to prevent the paging message from conflicting with the broadcast message.

It should be noted that, the predetermined transmission location is predefined, specified in a protocol, or preconfigured in a network.

It should be noted that, when there are a plurality of the foregoing second transmission locations, the second transmission manner in which the second paging message is transmitted at the second transmission location is another special repeated transmission manner.

Optionally, in this embodiment of this application, when the second transmission manner is the first transmission manner, for a second paging message of one SIM card, Step 701 may include the following step:

Step C1: The network device sends the second paging message to the UE in the first transmission manner based on an identifier of a target SIM card.

With reference to Step C1, Step 703 may include the following step:

Step C2: The UE receives the second paging message from the network device in the first transmission manner based on the identifier of the target SIM card, where the target SIM card includes the one SIM card and a SIM card that is in the UE and that has an association relationship with the one SIM card.

For example, if IMSI 1 of SIM card 1 of the UE is bound to IMSI 2 of SIM card 2, when a core network device wants to page SIM card 1 of the UE, it sends IMSI 1 and IMSI 2 to the RAN device to instruct the RAN device to perform paging message enhancement on a paging message of SIM card 1. The RAN device sends the paging message at both paging message transmission locations of SIM card 1 and SIM card 2.

According to the UE in this embodiment of this application, when the multi-card UE camps in the first cell, the UE leans, by obtaining the target information, whether the first cell supports and/or uses the first transmission manner to transmit paging messages, so that the UE can determine, based on the target information, the second transmission manner for receiving paging messages, and receive the first paging message from the network device in the second transmission manner, which avoids paging message loss and improves communication efficiency.

FIG. 10 is a possible schematic structural diagram of UE according to an embodiment of this application. The UE includes M SIM cards, where M is a positive integer greater than 1. As shown in FIG. 10, the UE 800 includes an obtaining module 801 and a receiving module 802.

The obtaining module 801 is configured to obtain target information when the UE 800 camps in a first cell, where the target information is used to indicate whether the first cell supports and/or uses a first transmission manner for transmitting paging messages.

The receiving module 802 is configured to receive a first paging message from a network device in a second transmission manner based on the target information obtained by the obtaining module 801, where the first paging message includes paging messages corresponding to N SIM cards, and the first transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, X is an integer greater than 1. N is a positive integer, and N is less than or equal to M.

Optionally, in a case where the target information is used to indicate that the first cell supports or uses the first transmission manner for transmitting paging messages, the second transmission manner is the first transmission manner.

Optionally, in a case where the target information is used to indicate that the first cell does not support or use the first transmission manner for transmitting paging messages, or in a case where the target information is used to indicate that the first cell supports the first transmission manner for transmitting paging messages but does not use the first transmission manner for transmitting paging messages, the second transmission manner is a non-first transmission manner.

Optionally, the target information is used to indicate the first transmission manner.

Optionally, the target information is carried in a broadcast message of the first cell, DCI, PDSCH, or MAC CE.

Optionally, the target information includes a transmission parameter for transmitting paging messages in the first transmission manner.

Optionally, the retransmitting the second paging message at X first transmission locations includes: retransmitting the second paging message at the X first transmission locations based on a first identifier corresponding to the UE 800, where the first identifier is used to indicate a third transmission location that is in a radio frame and that is used to transmit paging messages, and the X first transmission locations are X third transmission locations in at least one first radio frame.

Optionally, the X first transmission locations are X transmission locations that are in at least one first radio frame and that are used to transmit paging messages; the at least one first radio frame at least includes a target radio frame; the target radio frame is a radio frame adjacent to a second radio frame or a radio frame spaced from the second radio frame by at least one radio frame; and the second radio frame is an original radio frame used to transmit the second paging message.

Optionally, the second transmission location is a transmission location that is in a target radio frame and that is used to transmit paging messages; the target radio frame is a radio frame adjacent to a second radio frame or a radio frame spaced from the second radio frame by at least one radio frame; and the second radio frame is an original radio frame used to transmit the second paging message.

Optionally, the second transmission location is a predetermined transmission location, and the predetermined transmission location is predefined, specified in a protocol, or preconfigured in a network.

Optionally, when the second transmission manner is the first transmission manner, the receiving module 802 may be configured to: for the second paging message of the one SIM card, receive the second paging message from the network device in the first transmission manner based on the identifier of the target SIM card and the target information obtained by the obtaining module 801, where the target SIM card includes the one SIM card and a SIM card that is in the UE 800 and that has an association relationship with the one SIM card.

According to the UE in this embodiment of this application, in a case where the UE camps in the first cell, the UE leans, by obtaining the target information, whether the first cell supports and/or uses the first transmission manner to transmit paging messages, so that the UE can determine, based on the target information, the second transmission manner for receiving paging messages, and receive the paging message from the network device in the second transmission manner, which avoids paging message loss and improves communication efficiency.

The UE provided in this embodiment of this application can implement the processes in the foregoing method embodiments. To avoid repetition, details are not described herein again.

FIG. 11 is a possible schematic structural diagram of a network device according to an embodiment of this application. As shown in FIG. 11, the network device 900 includes a sending module 901.

The sending module 901 is configured to send a first paging message to UE in a second transmission manner in a case where the UE camps in a first cell, where the second transmission manner includes a first transmission manner or is a non-first transmission manner, the UE includes M SIM cards, the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, X and M are integers greater than 1, N is a positive integer, and N is less than or equal to M.

Optionally, when the first cell supports or uses the first transmission manner for transmitting paging messages, the second transmission manner is the first transmission manner.

Optionally, when the first cell does not support or use the first transmission manner for transmitting paging messages, or when the first cell supports the first transmission manner for transmitting paging messages but does not use the first transmission manner for transmitting paging messages, the second transmission manner is a non-first transmission manner.

Optionally, the retransmitting the second paging message at X first transmission locations includes: retransmitting the second paging message at the X first transmission locations based on a first identifier corresponding to the UE, where the first identifier is used to indicate a third transmission location that is in a radio frame and that is used to transmit paging messages, and the X first transmission locations are X third transmission locations in at least one first radio frame.

Optionally, the X first transmission locations are X transmission locations that are in at least one first radio frame and that are used to transmit paging messages, the at least one first radio frame at least includes a target radio frame; the target radio frame is a radio frame adjacent to a second radio frame or a radio frame spaced from the second radio frame by at least one radio frame; and the second radio frame is an original radio frame used to transmit the second paging message.

Optionally, the second transmission location is a transmission location that is in a target radio frame and that is used to transmit paging messages; the target radio frame is a radio frame adjacent to a second radio frame or a radio frame spaced from the second radio frame by at least one radio frame; and the second radio frame is an original radio frame used to transmit the second paging message.

Optionally, the second transmission location is a predetermined transmission location, and the predetermined transmission location is predefined, specified in a protocol, or preconfigured in a network.

Optionally, when the second transmission manner is the first transmission manner, the sending module 901 may be configured to: for the second paging message of the one SIM card, send the second paging message to the UE in the first transmission manner based on an identifier of a target SIM card, where the target SIM card includes the one SIM card and a SIM card that is in the UE and that has an association relationship with the one SIM card.

According to the network device in this embodiment of this application, in a case where the UE camps in the first cell, the network device determines, by learning whether the first cell supports and/or uses the first transmission manner to transmit paging messages, the second transmission manner for sending paging messages, and send the paging message to the UE in the second transmission manner, which avoids paging message loss and improves communication efficiency.

The network device provided in this embodiment of this application can implement the processes in the foregoing method embodiments. To avoid repetition, details are not described herein again.

Figure 12:
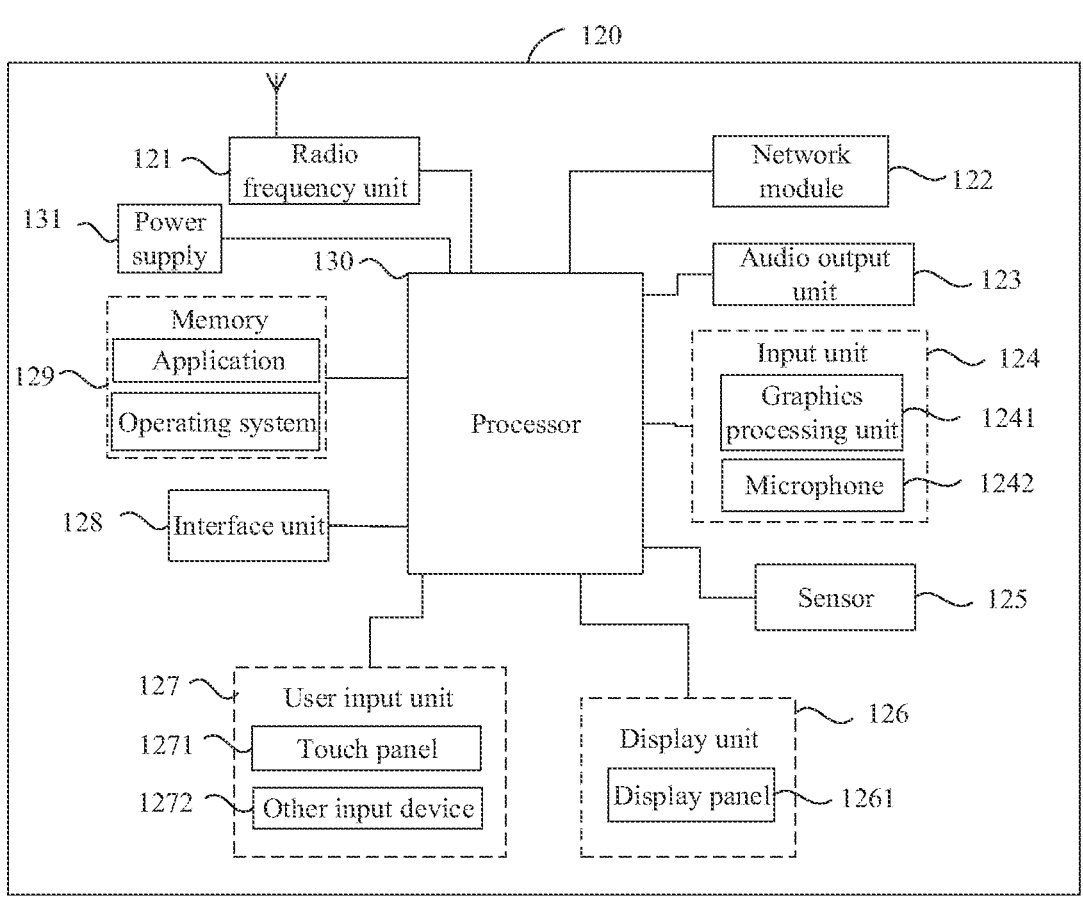
FIG. 12 is a schematic structural diagram of hardware of UE according to an embodiment of this application.

FIG. 12 is a schematic structural diagram of hardware of UE according to an embodiment of this application. The UE 120 includes but not limited to: a radio frequency unit 121, a network module 122, an audio output unit 123, an input unit 124, a sensor 125, a display unit 126, a user input unit 127, an interface unit 128, a memory 129, a processor 130, a power supply 131, and the like. A person skilled in the art may understand that a structure of the UE shown in FIG. 12 does not constitute a limitation on the UE, and the UE may include more or fewer components than those shown in the figure, or some components may be combined, or there may be a different component arrangement. In this embodiment of this application, the UE includes, but not limited to, a mobile phone, a tablet computer, a notebook computer, a palmtop computer, vehicle-mounted UE, a wearable device, a pedometer, or the like. The UE 120 includes M SIM cards, where M is an integer greater than 1.

The radio frequency unit 121 is configured to receive a first paging message from a RAN device in a target transmission manner, where the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, N is a positive integer, X is an integer greater than 1, and N is less than or equal to M.

According to the UE in this embodiment of this application, the UE is multi-card UE, and may receive the first paging message (including the paging messages corresponding to the N SIM cards) from the RAN device in the target transmission manner. Because the target transmission manner includes at least one of the following: for the second paging message of the one SIM card, retransmitting the second paging message at the X first transmission locations, transmitting the second paging message in the offset manner based on the predetermined offset and/or in the predetermined offset direction, or transmitting the second paging message at the second transmission location, a transmission location of the second paging message is changed or increased. Therefore, a problem that a paging message is lost because transmission locations of paging messages overlap when multi-card UE monitors paging messages of different SIM cards is avoided, which improves communication efficiency.

Alternatively, the processor 130 is configured to obtain target information when the UE 120 camps in a first cell, where the target information is used to indicate whether the first cell supports and/or uses a first transmission manner for transmitting paging messages. The radio frequency unit 121 is configured to receive a first paging message from a network device in a second transmission manner based on the target information obtained by the processor 130, where the first paging message includes paging messages corresponding to N SIM cards, and the first transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, X is an integer greater than 1, N is a positive integer, and N is less than or equal to M.

According to the UE in this embodiment of this application, in a case where the UE camps in the first cell, the UE leans, by obtaining the target information, whether the first cell supports and/or uses the first transmission manner to transmit paging messages, so that the UE can determine, based on the target information, the second transmission manner for receiving paging messages, and receive the paging message from the network device in the second transmission manner, which avoids paging message loss and improves communication efficiency.

It should be understood that, in this embodiment of this application, the radio frequency unit 121 may be configured to receive and send information, or receive and send signals during a call. For example, the radio frequency unit 121 receives downlink data from a base station, sends the downlink data to the processor 130 for processing, and sends uplink data to the base station. Generally, the radio frequency unit 121 includes, but is not limited to, an antenna, at least one amplifier, a transceiver, a coupler, a low noise amplifier, a duplexer, and the like. In addition, the radio frequency unit 121 may further communicate with another device by using a wireless communications system and network.

The UE provides a user with wireless broadband Internet access by using the network module 122, for example, helps the user send and receive emails, browse web pages, and access streaming media.

The audio output unit 123 may convert audio data received by the radio frequency unit 121 or the network module 122 or stored in the memory 129 into an audio signal, and output the audio signal into sound. In addition, the audio output unit 123 may also provide audio output related to a specific function performed by the UE 120 (for example, call signal receiving sound or message receiving sound). The audio output unit 123 includes a speaker, a buzzer, a receiver, and the like.

The input unit 124 is configured to receive audio or video signals. The input unit 124 may include a graphics processing unit (GPU) 1241 and a microphone 1242. The graphics processing unit 1241 processes image data of a static picture or a video obtained by an image capturing apparatus (for example, a camera) in video capturing mode or image capturing mode. A processed image frame can be displayed on the display unit 126. The image frame processed by the graphics processing unit 1241 may be stored in the memory 129 (or another storage medium) or sent via the radio frequency unit 121 or the network module 122. The micro-phone 1242 may receive a sound and can process such sound into audio data. The processed audio data may be converted, in a call mode, into a format that can be sent by using the radio frequency unit 121 to a mobile communication base station, for outputting.

The UE 120 further includes at least one sensor 125, for example, a light sensor, a motion sensor, and other sensors. The light sensor includes an ambient light sensor and a proximity sensor, where the ambient light sensor may adjust brightness of the display panel 1261 depending on bright-ness of ambient light, and the proximity sensor may turn off the display panel 1261 and/or backlight when the UE 120 moves towards an ear. As a motion sensor, an accelerometer sensor may detect magnitude of acceleration in various directions (usually three axes), may detect magnitude and the direction of gravity when stationary, may be configured to identify UE postures (such as horizontal and vertical screen switch, related games, and magnetometer posture calibration), may perform functions related to vibration identification (such as a pedometer and a knock), and the like. The sensor 125 may further include a fingerprint sensor, a pressure sensor, an iris sensor, a molecular sensor, a gyroscope, a barometer, a hygrometer, a thermometer, an infrared sensor, or the like. Details are not described herein.

The display unit 126 is configured to display information input by the user or information provided to the user. The display unit 126 may include the display panel 1261, and the display panel 1261 may be configured in a form of a liquid crystal display (LCD), an organic light-emitting diode (OLED), or the like.

The user input unit 127 may be configured to receive input numeric or character information, and generate key signal inputs related to user settings and function control of the UE. The user input unit 127 includes a touch panel 1271 and another input device 1272. The touch panel 1271, also called a touch screen, may collect a touch operation of the user on or near the touch panel 1271 (for example, an operation performed by the user with any suitable object or accessory such as a finger or a stylus on or near the touch panel 1271). The touch panel 1271 may include two parts: a touch detection apparatus and a touch controller. The touch detec-tion apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 130, and receives and executes a command from the processor 130. In addition, the touch panel 1271 may be implemented by using a plurality of types such as a resistive type, a capacitive type, an infrared ray, and a surface acoustic wave. In addition to the touch panel 1271, the user input unit 127 may further include the another input device 1272. The another input device 1272 may include, but is not limited to, a physical keyboard, functional keys (for example, a volume control key and a switch key), a trackball, a mouse, and a joystick. Details are not described herein again.

Further, the touch panel 1271 may cover the display panel 1261. When detecting the touch operation on or near the touch panel 1271, the touch panel 1271 transmits the touch operation to the processor 130 to determine a type of a touch event, and then the processor 130 provides corresponding visual output on the display panel 1261 based on the type of the touch event. Although in FIG. 12, the touch panel 1271 and the display panel 1261 are used as two independent components to implement input and output functions of the UE, in some embodiments, the touch panel 1271 and the display panel 1261 may be integrated to implement the input and output functions of the UE. This is not specifically limited herein.

The interface unit 128 is an interface for connecting an external apparatus to the UE 120. For example, the external apparatus may include a wired or wireless headset jack, an external power supply (or a battery charger) port, a wired or wireless data port, a storage card port, a port for connecting an apparatus having an identification module, an audio input/output (I/O) port, a video V/O port, a headset jack, or the like. The interface unit 128 may be configured to receive an input (for example, data information and power) from the external apparatus and transmit the received input to one or more elements in the UE 120, or transmit data between UE 120 and the external apparatus.

The memory 129 may be configured to store a software program and various data. The memory 129 may mainly include a program storage area and a data storage area. The program storage area may store an operating system, an application required by at least one function (for example, an audio playing function and an image playing function), and the like. The data storage area may store data (for example, audio data and an address book) created according to use of the mobile phone. In addition, the memory 129 may include a high-speed random access memory, and may further include a non-volatile memory such as at least one magnetic disk storage component, a flash memory component, or another volatile solid-state storage component.

The processor 130 is a control center of the UE, connects various parts of the entire UE by using various interfaces and circuits, and performs various functions of the UE and processes data by running or executing software programs and/or modules stored in the memory 129 and invoking data stored in the memory 129, so as to monitor the UE as a whole. The processor 130 may include one or more pro-cessing units. Optionally, the processor 130 may integrate an application processor with a modem processor. The appli-cation processor mainly processes the operating system, a user interface, the application program, and the like, and the modem processor mainly processes wireless communica-tion. It can be understood that the above-mentioned modem processor may not be integrated in the processor 130.

The UE 120 may further include the power supply 131 (such as a battery) that supplies power to each component. Optionally, the power supply 131 may be logically con-nected to the processor 130 by using a power management system, so as to implement functions such as charging, discharging, and power consumption management by using the power management system.

In addition, the UE 120 includes some function modules not shown. Details are not described herein.

Figure 13:
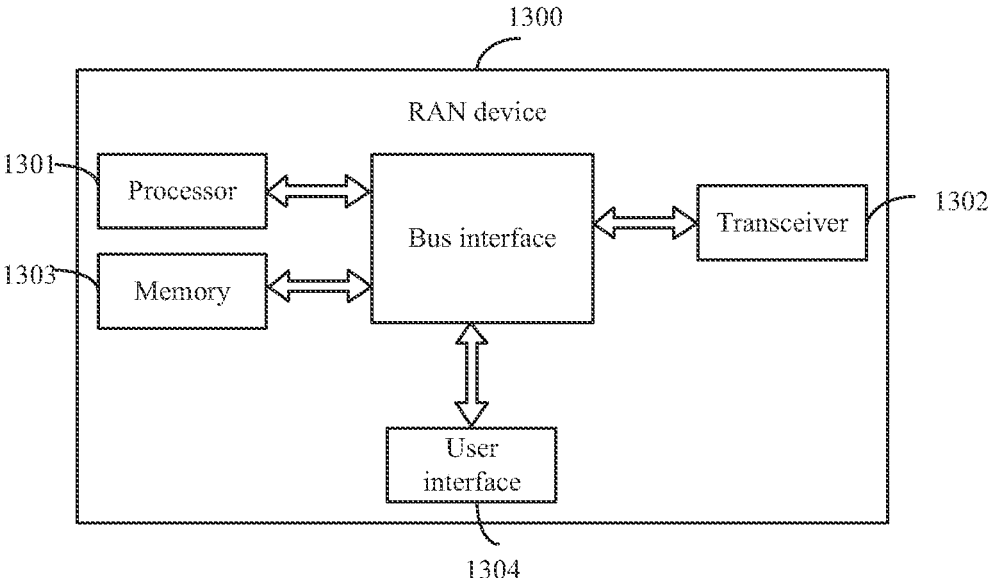
FIG. 13 is a schematic structural diagram of hardware of a RAN device according to an embodiment of this application.

FIG. 13 is a schematic structural diagram of hardware of a RAN device according to an embodiment of this applica-tion. The RAN device 1300 includes a processor 1301, a transceiver 1302, a memory 1303, a user interface 1304, and a bus interface.

The transceiver 1302 is configured to receive indication information from a core network device, and send a first paging message to UE in a target transmission manner, where the UE includes M SIM cards, the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, M and X are integers greater than 1. N is a positive integer, and N is less than or equal to M.

According to the RAN device in this embodiment of this application, after receiving the indication information from the core network device, the RAN device can send the first paging message (including the paging messages corresponding to the N SIM cards) to the UE in the target transmission manner based on the indication information. Because the target transmission manner includes at least one of the following: for the second paging message of the one SIM card, retransmitting the second paging message at the X first transmission locations, transmitting the second paging message in the offset manner based on the predetermined offset and/or in the predetermined offset direction, or transmitting the second paging message at the second transmission location, a transmission location of the second paging message is changed or increased. Therefore, a problem that a paging message is lost because transmission locations of paging messages overlap when multi-card UE monitors paging messages of different SIM cards is avoided, which improves communication efficiency.

In this embodiment of the present invention, in FIG. 13, a bus architecture may include any quantity of interconnected buses and bridges, and may be linked by various circuits of one or more processors represented by the processor 1301 and a memory represented by the memory 1303. The bus architecture may further link together various other circuits such as peripheral devices, voltage regulators, and power management circuits. These are all known in the art, and therefore, no further description is provided herein. The bus interface provides an interface. The transceiver 1302 may be a plurality of components. To be specific, the transceiver 1302 includes a transmitter and a receiver, and provides a unit configured to communicate with various other apparatuses on a transmission medium. For different user equipment, the user interface 1304 may alternatively be an interface for externally and internally connecting a required device. The connected device includes, but not limited to, a keypad, a display, a loudspeaker, a microphone, a joystick, and the like. The processor 1301 is responsible for management of a bus architecture and general processing. The memory 1303 may store data used when the processor 1301 performs an operation.

In addition, the RAN device 1300 further includes some function modules not shown, and details are not described herein.

Figures 14, 15:
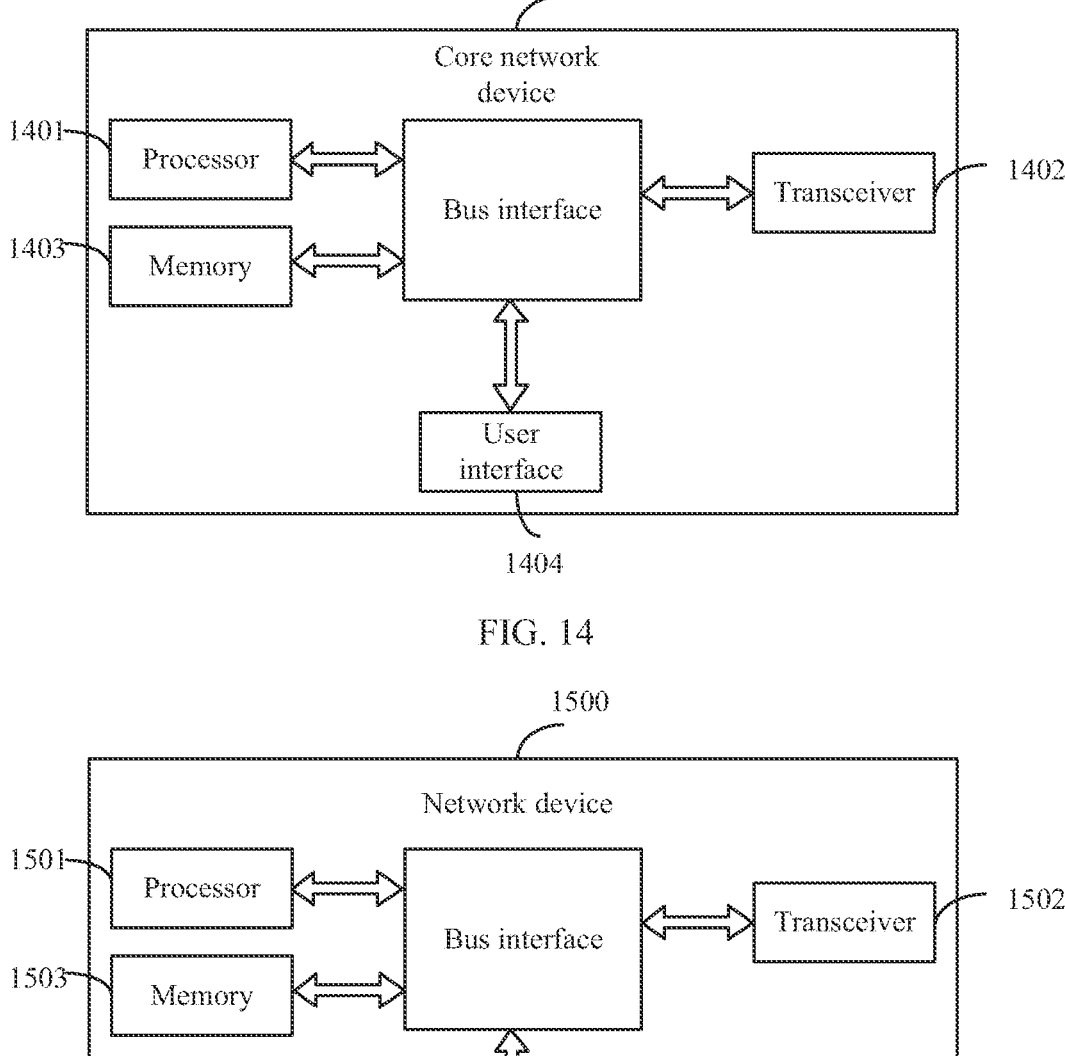
FIG. 14 is a schematic structural diagram of hardware of a core network device according to an embodiment of this application.
FIG. 15 is a schematic structural diagram of hardware of a network device according to an embodiment of this application.

FIG. 14 is a schematic structural diagram of hardware of a core network device according to an embodiment of this application. The core network device 1400 includes a processor 1401, a transceiver 1402, a memory 1403, a user interface 1404, and a bus interface.

The transceiver 1402 is configured to send indication information to a RAN device, where the indication information is used to indicate a target transmission manner and is further used to instruct the RAN device to send a first paging message to UE in the target transmission manner, the UE includes M SIM cards, the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message, M and X are integers greater than 1, N is a positive integer, and N is less than or equal to M.

According to the core network device in this embodiment of this application, when the core network device needs to page the UE, it sends the indication information to the RAN device, so as to instruct the RAN device to send the first paging message (including the paging messages corresponding to the N SIM cards) to the UE in the target transmission manner based on the indication information. Because the target transmission manner includes at least one of the following: for the second paging message of the one SIM card, retransmitting the second paging message at the X first transmission locations, transmitting the second paging message in the offset manner based on the predetermined offset and/or in the predetermined offset direction, or transmitting the second paging message at the second transmission location, a transmission location of the second paging message is changed or increased. Therefore, a problem that a paging message is lost because transmission locations of paging messages overlap when multi-card UE monitors paging messages of different SIM cards is avoided, which improves communication efficiency.

In this embodiment of the present invention, in FIG. 14, a bus architecture may include any quantity of interconnected buses and bridges, and may be linked by various circuits of one or more processors represented by the processor 1401 and a memory represented by the memory 1403. The bus architecture may further link together various other circuits such as peripheral devices, voltage regulators, and power management circuits. These are all known in the art, and therefore, no further description is provided herein. The bus interface provides an interface. The transceiver 1402 may be a plurality of components. To be specific, the transceiver 1402 includes a transmitter and a receiver, and provides a unit configured to communicate with various other apparatuses on a transmission medium. For different user equipment, the user interface 1404 may alternatively be an interface for externally and internally connecting a required device. The connected device includes, but not limited to, a keypad, a display, a loudspeaker, a microphone, a joystick, and the like. The processor 1401 is responsible for management of a bus architecture and general processing. The memory 1403 may store data used when the processor 1401 performs an operation.

In addition, the core network device 1400 further includes some function modules not shown, and details are not described herein.

FIG. 15 is a schematic structural diagram of hardware of a network device according to an embodiment of this application. The network device 1500 includes a processor 1501, a transceiver 1502, a memory 1503, a user interface 1504, and a bus interface.

The transceiver 1502 is configured to send a first paging message to UE in a second transmission manner in a case where the UE camps in a first cell, where the second transmission manner includes a first transmission manner or is a non-first transmission manner, the UE includes M SIM cards, the first paging message includes paging messages corresponding to N SIM cards, and the target transmission manner includes at least one of the following: for a second paging message of one SIM card, retransmitting the second paging message at X first transmission locations, transmitting the second paging message in an offset manner based on a predetermined offset and/or in a predetermined offset direction, or transmitting the second paging message at a second transmission location, where the second transmission location is different from an original transmission location that is used to transmit the second paging message. X and M are integers greater than 1, N is a positive integer, and N is less than or equal to M.

According to the network device in this embodiment of this application, in a case where the UE camps in the first cell, the network device determines, by learning whether the first cell supports and/or uses the first transmission manner to transmit paging messages, the second transmission manner for sending paging messages, and send the paging message to the UE in the second transmission manner, which avoids paging message loss and improves communication efficiency.

In this embodiment of the present invention, in FIG. 15, a bus architecture may include any quantity of interconnected buses and bridges, and may be linked by various circuits of one or more processors represented by the processor 1501 and a memory represented by the memory 1503. The bus architecture may further link together various other circuits such as peripheral devices, voltage regulators, and power management circuits. These are all known in the art, and therefore, no further description is provided herein. The bus interface provides an interface. The transceiver 1502 may be a plurality of components. To be specific, the transceiver 1502 includes a transmitter and a receiver, and provides a unit configured to communicate with various other apparatuses on a transmission medium. For different user equipment, the user interface 1504 may alternatively be an interface for externally and internally connecting a required device. The connected device includes, but not limited to, a keypad, a display, a loudspeaker, a microphone, a joystick, and the like. The processor 1501 is responsible for management of a bus architecture and general processing. The memory 1503 may store data used when the processor 1501 performs an operation.

In addition, the network device 1500 further includes some function modules not shown, and details are not described herein.

Optionally, an embodiment of this application further provides UE. As shown in FIG. 12, the UE includes a processor 130, a memory 129, and a computer program stored in the memory 129 and executable on the processor 130. When the computer program is executed by the processor 130, the processes of the foregoing paging message transmission method embodiments are implemented, and same technical effects can be achieved. To avoid repetition, details are not described herein again.

Optionally, an embodiment of this application further provides a RAN device, including a processor, a memory, and a computer program stored in the memory and executable on the processor. When the computer program is executed by the processor, the processes of the foregoing paging message transmission method are implemented, and same technical effects can be achieved. To avoid repetition, details are not described herein.

Optionally, an embodiment of this application further provides a core network device, including a processor, a memory, and a computer program stored in the memory and executable on the processor. When the computer program is executed by the processor, the processes of the foregoing paging message transmission method are implemented, and same technical effects can be achieved. To avoid repetition, details are not described herein.

Optionally, an embodiment of this application further provides a network device, including a processor, a memory, and a computer program stored in the memory and executable on the processor. When the computer program is executed by the processor, the processes of the paging message transmission method in the foregoing embodiments are implemented, and same technical effects can be achieved. To avoid repetition, details are not described herein.

An embodiment of the application further provides a non-transitory computer-readable storage medium. The non-transitory computer-readable storage medium stores a computer program, and when the computer program is executed by a processor, the processes of the foregoing paging message transmission method embodiments are implemented, and same technical effects can be achieved. To avoid repetition, details are not described herein. The non-transitory computer-readable storage medium may be a read-only memory (ROM), a random access memory (RAM), a magnetic disk, a compact disc, or the like.

It should be noted that the terms "include", "comprise" or any other variants thereof herein are intended to cover a non-exclusive inclusion, so that a process, a method, an article or equipment that includes a list of elements not only includes those elements, and further includes another element not expressly listed, or an element inherent to such a process, a method, an article, or equipment. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from the protection scope of aims of this application and claims, all of which fall within the protection of this application.

What is claimed is:

1. A paging message transmission method, applied to a radio access network (RAN) device, wherein the method comprises:

receiving indication information from a core network device, wherein the indication information is used to indicate a target transmission manner; and sending a first paging message to user equipment (UE) in the target transmission manner, wherein the UE comprises M subscriber identity module (SIM) cards, the first paging message comprises paging messages corresponding to N SIM cards of the UE, and in a case where the UE is inactive, the indication information is sent by the core network device to the RAN device before the UE enters an inactive period; and the target transmission manner comprises: for a second paging message of one SIM card, retransmitting the second paging message at X first transmission locations, wherein the retransmitting the second paging message at the X first transmission locations comprises: retransmitting the second paging message at the X first transmission locations based on a first identifier corresponding to the UE, wherein the first identifier is used to indicate a third transmission location that is in a radio frame and that is used to transmit paging messages, and the X first transmission locations are X third transmission locations in at least one radio frame; wherein M and X are integers greater than 1, N is a positive integer, and N is less than or equal to M;

the first identifier is paging message density (Ns), and the retransmitting the second paging message at the X first transmission locations based on a first identifier corresponding to the UE comprises:

in a case that a Ns corresponding to the UE equals 1, retransmitting the second paging message at transmission locations in at least two radio frames; and in a case that the Ns corresponding to the UE equals 2 or 4, retransmitting the second paging message at at least two transmission locations in one radio frame, or retransmitting the second paging message at transmission locations in at least two radio frames;

for a paging message of one SIM card, the indication information comprises an identifier of a target SIM card;

the target SIM card comprises the one SIM card and a SIM card that is in the UE and that has an association relationship with the one SIM card; and the one SIM card is SIM card 1, the SIM card that is in the UE and that has the association relationship with the one SIM card is SIM card 2, and when the core network device pages the SIM card 1, the RAN device sends paging messages for the SIM card 1 at both paging message transmission locations of the SIM card 1 and the SIM card 2.

2. The method according to claim 1, wherein before the receiving indication information from the core network device, the method further comprises:

receiving first information from the UE; and sending the first information to the core network device, wherein the first information is used to indicate the target transmission manner; and the first information is used to indicate at least one of: the UE comprises the M SIM cards, whether radio access technologies (RATs) of at least two of the M SIM cards are the same, whether operators of at least two of the M SIM cards are the same, or whether transmission locations of paging messages corresponding to at least two of the M SIM cards overlap.

3. The method according to claim 1, wherein before the receiving indication information from the core network device, the method further comprises:

sending second information to the core network device, wherein the second information is a parameter used to determine a monitoring occasion for a paging message in a cell controlled by the RAN device; the second information comprises at least one of:

a first quantity, a monitoring occasion for a first physical downlink control channel (PDCCH) corresponding to a paging occasion, offset of the monitoring occasion for the paging message in the cell, configuration information of a discontinuous reception (DRX) period of the cell, a quantity of synchronization signal blocks (SSBs) in the cell, a parameter used to indicate whether all SSBs or partial SSBs in the cell are sent, a subcarrier spacing of the cell, or an identifier of the cell; and the first quantity is a quantity of transmission locations used to transmit paging messages in a radio frame in the cell.

4. A radio access network (RAN) device, wherein the RAN device comprises a processor, a memory, and a computer program stored in the memory and executable on the processor, and when the computer program is executed by the processor, the steps of the paging message transmission method according to claim 1 are implemented.

5. A paging message transmission method, applied to a core network device, wherein the method comprises:

sending indication information to a radio access network (RAN) device, wherein the indication information is used to indicate a target transmission manner; the indication information is further used to instruct the RAN device to send a first paging message to user equipment (UE) in the target transmission manner; the UE comprises M subscriber identity module (SIM) cards; the first paging message comprises paging messages corresponding to N SIM cards; and in a case where the UE is inactive, the indication information is sent by the core network device to the RAN device before the UE enters an inactive period; and the target transmission manner comprises: for a second paging message of one SIM card, retransmitting the second paging message at X first transmission locations, wherein the retransmitting the second paging message at the X first transmission locations comprises: retransmitting the second paging message at the X first transmission locations based on a first identifier corresponding to the UE, wherein the first identifier is used to indicate a third transmission location that is in a radio frame and that is used to transmit paging messages, and the X first transmission locations are X third transmission locations in at least one radio frame; wherein M and X are integers greater than 1, N is a positive integer, and N is less than or equal to M;

the first identifier is paging message density (Ns), and the retransmitting the second paging message at the X first transmission locations based on a first identifier corresponding to the UE comprises:

in a case that a Ns corresponding to the UE equals 1, retransmitting the second paging message at transmission locations in at least two radio frames; and in a case that the Ns corresponding to the UE equals 2 or 4, retransmitting the second paging message at at least two transmission locations in one radio frame, or retransmitting the second paging message at transmission locations in at least two radio frames;

for a paging message of one SIM card, the indication information comprises an identifier of a target SIM card;

the target SIM card comprises the one SIM card and a SIM card that is in the UE and that has an association relationship with the one SIM card;

the one SIM card is SIM card 1, the SIM card that is in the UE and that has the association relationship with the one SIM card is SIM card 2, and when the core network device pages the SIM card 1, paging messages for the SIM card 1 are sent by the RAN device at both paging message transmission locations of the SIM card 1 and the SIM card 2.

6. A core network device, wherein the core network device comprises a processor, a memory, and a computer program stored in the memory and executable on the processor, and when the computer program is executed by the processor, the steps of the paging message transmission method according to claim 5 are implemented.

7. A paging message transmission method, applied to user equipment (UE), wherein the UE comprises M subscriber identity module (SIM) cards, M is a positive integer greater than 1, and the method comprises:

obtaining target information in a case where the UE camps in a first cell, wherein the target information is used to indicate whether the first cell supports and/or uses a first transmission manner for transmitting paging messages; and receiving a first paging message from a network device in a second transmission manner based on the target information, wherein the first paging message comprises paging messages corresponding to N SIM cards; and the first transmission manner comprises: for a second paging message of one SIM card, retransmitting the second paging message at X first transmission locations, wherein the retransmitting the second paging message at the X first transmission locations comprises: retransmitting the second paging message at the X first transmission locations based on a first identifier corresponding to the UE, wherein the first identifier is used to indicate a third transmission location that is in a radio frame and that is used to transmit paging messages, and the X first transmission locations are X third transmission locations in at least one radio frame; wherein N is a positive integer and is less than or equal to M, and X is an integer greater than 1;

the first identifier is paging message density (Ns), and the retransmitting the second paging message at the X first transmission locations based on a first identifier corresponding to the UE comprises:

in a case that a Ns corresponding to the UE equals 1, retransmitting the second paging message at transmission locations in at least two radio frames; and in a case that the Ns corresponding to the UE equals 2 or 4, retransmitting the second paging message at at least two transmission locations in one radio frame, or retransmitting the second paging message at transmission locations in at least two radio frames;

when the second transmission manner is the first transmission manner, the receiving a first paging message from a network device in a second transmission manner based on the target information comprises:

for the second paging message of the one SIM card, receiving the second paging message from the network device in the first transmission manner based on an identifier of a target SIM card and the target information;

the target SIM card comprises the one SIM card and a SIM card that is in the UE and that has an association relationship with the one SIM card;

the one SIM card is SIM card 1, the SIM card that is in the UE and that has the association relationship with the one SIM card is SIM card 2, and when a core network device pages the SIM card 1, the UE receives paging messages for the SIM card 1 sent by an RAN device at both paging message transmission locations of the SIM card 1 and the SIM card 2.

8. The method according to claim 7, wherein in a case where the target information is used to indicate that the first cell supports or uses the first transmission manner for transmitting paging messages, the second transmission manner is the first transmission manner.

9. The method according to claim 7, wherein in a case where the target information is used to indicate that the first cell does not support or use the first transmission manner for transmitting paging messages, or in a case where the target information is used to indicate that the first cell supports the first transmission manner for transmitting paging messages but does not use the first transmission manner for transmitting paging messages, the second transmission manner is a non-first transmission manner.

10. The method according to claim 8, wherein the target information is used to indicate the first transmission manner; the target information comprises a transmission parameter for transmitting paging messages in the first transmission manner.

11. User equipment (UE), wherein the UE comprises a processor, a memory, and a computer program stored in the memory and executable on the processor, and when the computer program is executed by the processor, the steps of the paging message transmission method according to claim 7 are implemented.

* * * * *